US012578472B2

(12) United States Patent
Chen et al.

(10) Patent No.: US 12,578,472 B2
(45) Date of Patent: Mar. 17, 2026

(54) POSITIONING DATA GENERATION METHOD, APPARATUS, AND ELECTRONIC DEVICE

(71) Applicant: ALIBABA GROUP HOLDING LIMITED, Grand Cayman (KY)

(72) Inventors: Cheng Chen, Beijing (CN); Shuai Zhou, Beijing (CN); Qiang Xu, Beijing (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 1103 days.

(21) Appl. No.: 17/314,809

(22) Filed: May 7, 2021

(65) Prior Publication Data

US 2021/0263135 A1 Aug. 26, 2021

Related U.S. Application Data

(63) Continuation of application No. PCT/CN2019/115309, filed on Nov. 4, 2019.

(30) Foreign Application Priority Data

Nov. 9, 2018 (CN) .......................... 201811332366.3

(51) Int. Cl.
*G01S 17/89* (2020.01)
*G01S 7/48* (2006.01)
(Continued)

(52) U.S. Cl.
CPC ............ *G01S 17/89* (2013.01); *G01S 7/4802* (2013.01); *G01S 7/4808* (2013.01); *G01S 17/42* (2013.01);
(Continued)

(58) Field of Classification Search
None
See application file for complete search history.

(56) References Cited

U.S. PATENT DOCUMENTS 10,599,154 B2 3/2020 Dean et al.
10,788,836 B2 9/2020 Ebrahimi Afrouzi et al.
(Continued)

FOREIGN PATENT DOCUMENTS

CN 103778429 A 5/2014
CN 104850834 A 8/2015
(Continued)

OTHER PUBLICATIONS

Sun et al., "Real-time ground point clouds extraction algorithm using extended vertices", Computer Engineering and Applications, 2016, 52(24):6-10. (applied translation) (Year: 2016).*
(Continued)

*Primary Examiner* — Angela Y Ortiz
*Assistant Examiner* — Charles Pall
(74) *Attorney, Agent, or Firm* — Sheppard Mullin Richter & Hampton LLP

(57) ABSTRACT

A positioning data generation method, an apparatus, and an electronic device are provided. The method comprises: obtaining laser point cloud data in a preset regional range on or by either side of the road; extracting laser point data of key points of a target object on or by either side of the road from the laser point cloud data, wherein the target object is a road object with a stable attribute on or by either side of the road; and storing the extracted laser point data of the key points of the target object as a piece of a plurality of pieces of positioning data of the road, the plurality of pieces of positioning data corresponding to a plurality of target objects on or by either side of the road.

12 Claims, 17 Drawing Sheets

(51) Int. Cl.

| | | |
|---|---|---|
| *G01S 17/42* | (2006.01) | |
| *G06F 18/21* | (2023.01) | |
| *G06F 18/24* | (2023.01) | |
| *G06V 10/46* | (2022.01) | |
| *G06V 20/56* | (2022.01) | |

(52) U.S. Cl.

CPC .......... *G06F 18/2163* (2023.01); *G06F 18/24* (2023.01); *G06V 10/462* (2022.01); *G06V 20/588* (2022.01)

(56) References Cited

U.S. PATENT DOCUMENTS

| | | | |
|---|---|---|---|
| 2013/0080057 A1* | 3/2013 | Welty ..................... G06V 10/26 702/150 |
| 2017/0053538 A1 | 2/2017 | Samarasekera et al. |
| 2017/0227647 A1 | 8/2017 | Baik |
| 2017/0294026 A1* | 10/2017 | Choi ..................... G01S 7/4808 |
| 2017/0344015 A1* | 11/2017 | Song ..................... G05D 1/0231 |
| 2018/0225515 A1* | 8/2018 | Jiang ....................... G06V 20/58 |
| 2019/0001935 A1* | 1/2019 | Ham ........................ G08G 5/21 |
| 2019/0146062 A1* | 5/2019 | Wan ..................... G05D 1/0088 345/419 |
| 2019/0156507 A1* | 5/2019 | Zeng ....................... G06F 16/29 |
| 2019/0346271 A1 | 11/2019 | Zhang et al. |
| 2019/0369637 A1 | 12/2019 | Shalev-Shwartz et al. |
| 2020/0081134 A1 | 3/2020 | Wheeler et al. |

FOREIGN PATENT DOCUMENTS

| | | | | |
|---|---|---|---|---|
| CN | 105184852 A | 12/2015 | | |
| CN | 105667518 A | 6/2016 | | |
| CN | 106022259 A | 10/2016 | | |
| CN | 106503678 A | 3/2017 | | |
| CN | 107169464 A | 9/2017 | | |
| CN | 107451526 A | 12/2017 | | |
| CN | 107918753 A | 4/2018 | | |
| CN | 108267747 A | * | 7/2018 | ............ G01S 17/89 |
| CN | 108334802 A | 7/2018 | | |
| CN | 110062871 A | 7/2019 | | |
| CN | 110462544 A | 11/2019 | | |
| EP | 3131020 B1 | 12/2017 | | |
| EP | 3130945 B1 | 5/2018 | | |
| JP | 6871782 B2 | * | 5/2021 | |
| WO | 2017066679 A9 | 5/2017 | | |
| WO | 2018071416 A1 | 4/2018 | | |
| WO | 2018126083 A1 | 7/2018 | | |
| WO | 2018126228 A1 | 7/2018 | | |
| WO | 2018140701 A1 | 8/2018 | | |
| WO | 2019018315 A1 | 1/2019 | | |
| WO | 2019168869 A1 | 9/2019 | | |

OTHER PUBLICATIONS

Supplementary Search Report for Chinese Application No. 201811332366.3 mailed on Nov. 4, 2023.

Sun et al., "Real-time ground point clouds extraction algorithm using extended vertices," Dec. 15, 2016.

First Search Report for Chinese Application No. 201811332366.3 mailed on Mar. 27, 2023.

International Preliminary Report on Patentability Chapter I for PCT Application No. PCT/CN2019/115309 mailed on May 20, 2021.

Written Opinion of the International Searching Authority and International Search Report for PCT Application No. PCT/CN2019/115309 mailed on Feb. 7, 2020.

* cited by examiner

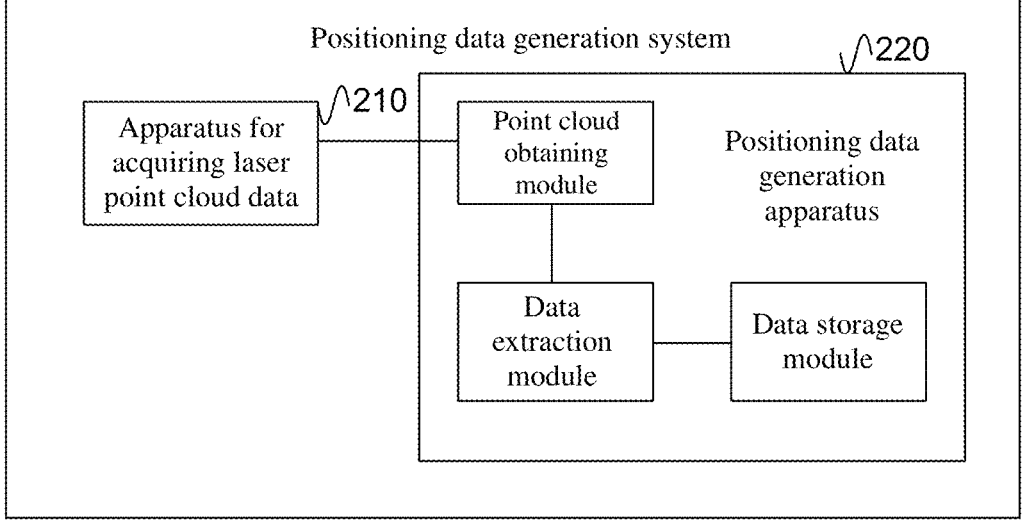

FIG. 2

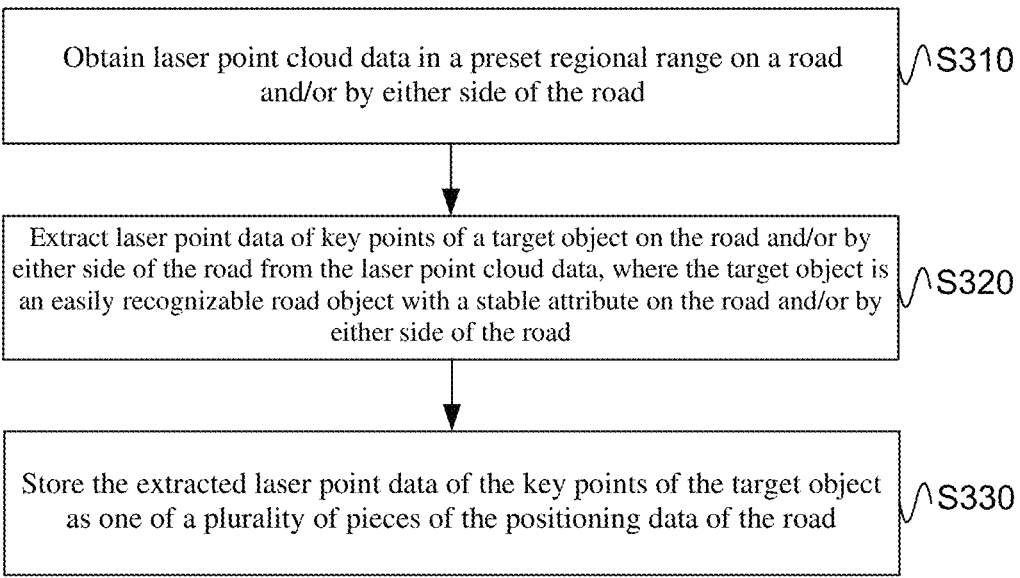

Obtain laser point cloud data in a preset regional range on a road and/or by either side of the road ⟋⟍S310

Extract laser point data of key points of a target object on the road and/or by either side of the road from the laser point cloud data, where the target object is an easily recognizable road object with a stable attribute on the road and/or by either side of the road ⟋⟍S320

Store the extracted laser point data of the key points of the target object as one of a plurality of pieces of the positioning data of the road ⟋⟍S330

FIG. 3a

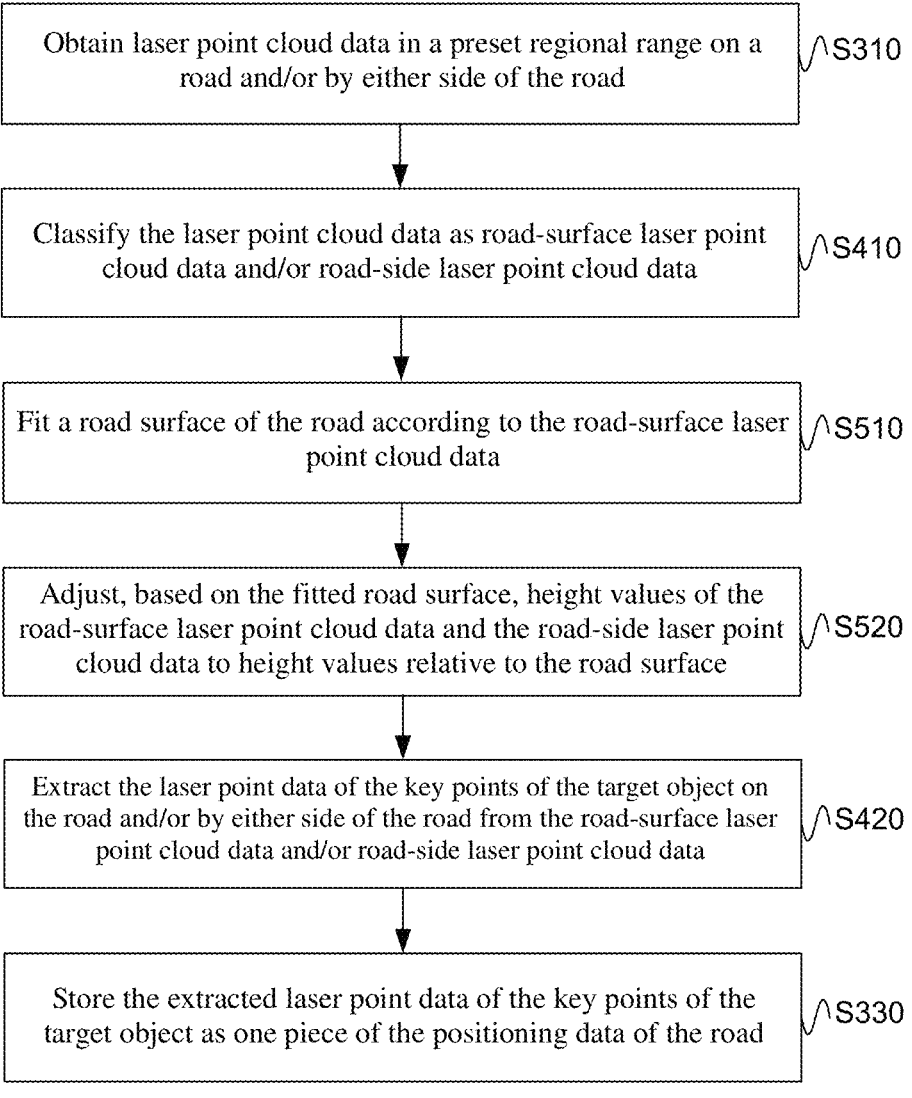

Obtain laser point cloud data in a preset regional range on a road and/or by either side of the road /\S310

Classify the laser point cloud data as road-surface laser point cloud data and/or road-side laser point cloud data /\S410

Fit a road surface of the road according to the road-surface laser point cloud data /\S510

Adjust, based on the fitted road surface, height values of the road-surface laser point cloud data and the road-side laser point cloud data to height values relative to the road surface /\S520

Extract the laser point data of the key points of the target object on the road and/or by either side of the road from the road-surface laser point cloud data and/or road-side laser point cloud data /\S420

Store the extracted laser point data of the key points of the target object as one piece of the positioning data of the road /\S330

FIG. 5

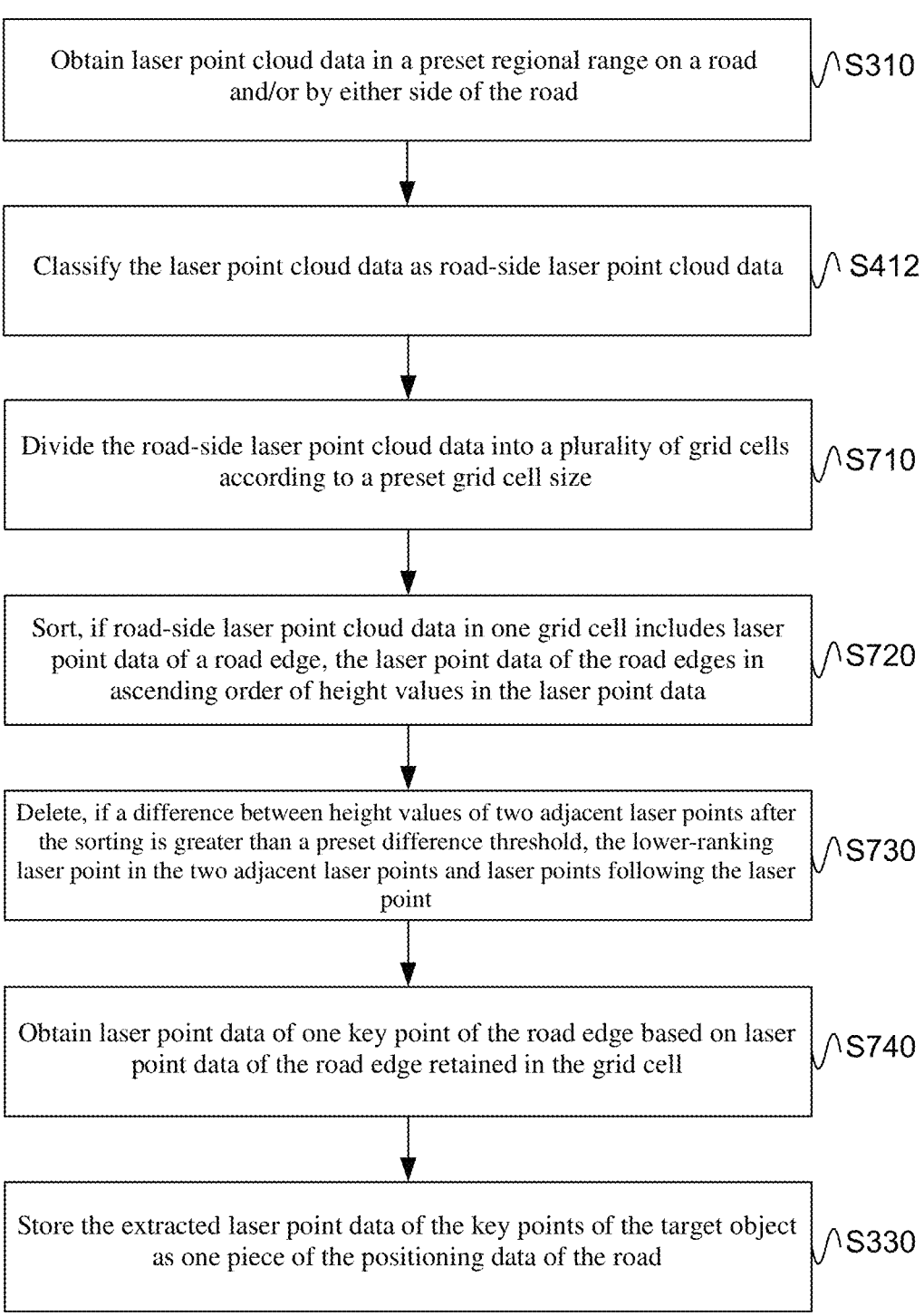

Obtain laser point cloud data in a preset regional range on a road and/or by either side of the road	S310

Classify the laser point cloud data as road-side laser point cloud data	S412

Divide the road-side laser point cloud data into a plurality of grid cells according to a preset grid cell size	S710

Sort, if road-side laser point cloud data in one grid cell includes laser point data of a road edge, the laser point data of the road edges in ascending order of height values in the laser point data	S720

Delete, if a difference between height values of two adjacent laser points after the sorting is greater than a preset difference threshold, the lower-ranking laser point in the two adjacent laser points and laser points following the laser point	S730

Obtain laser point data of one key point of the road edge based on laser point data of the road edge retained in the grid cell	S740

Store the extracted laser point data of the key points of the target object as one piece of the positioning data of the road	S330

FIG. 7a

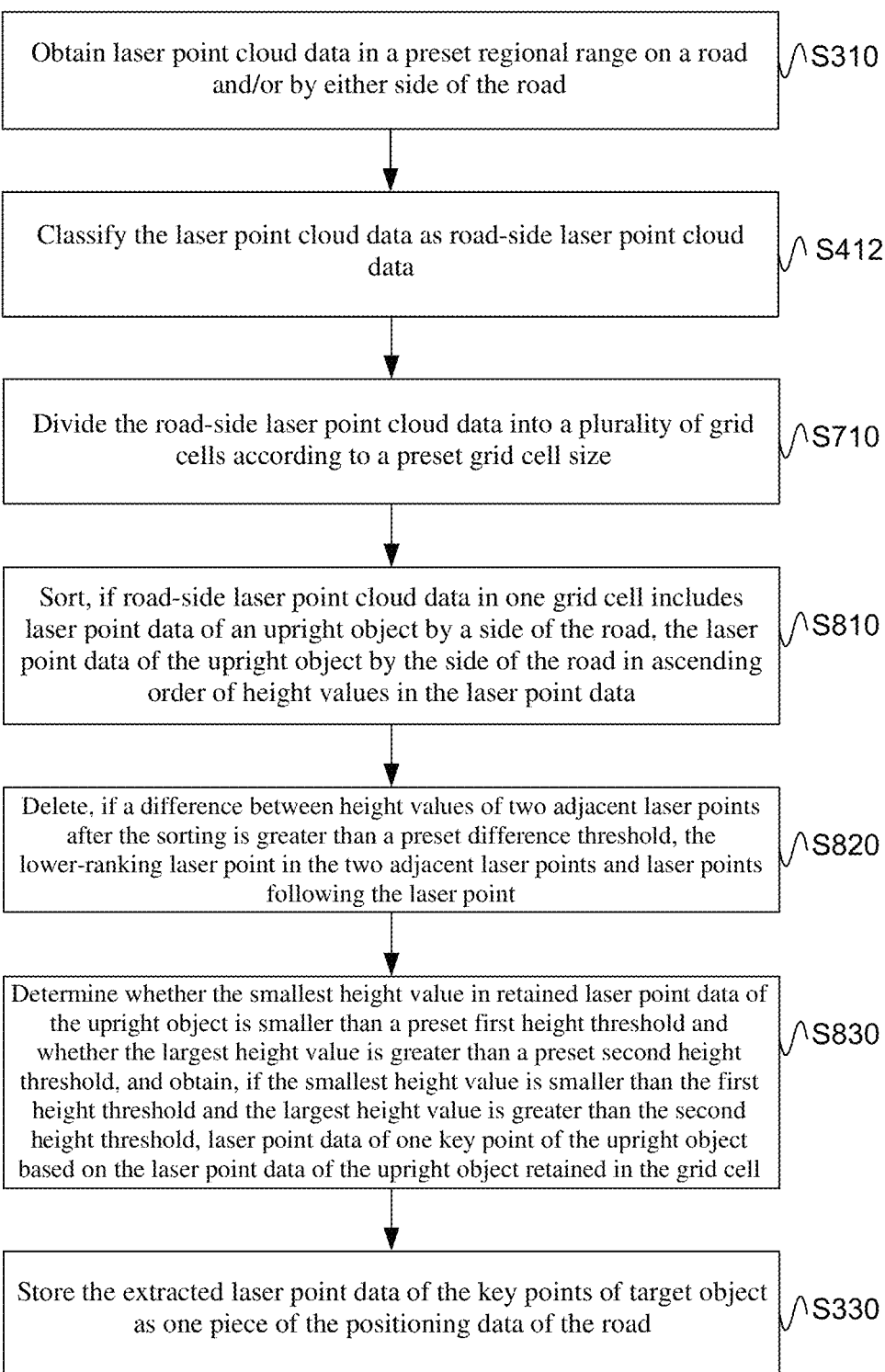

Obtain laser point cloud data in a preset regional range on a road and/or by either side of the road ⟍∧S310

Classify the laser point cloud data as road-side laser point cloud data ⟍∧S412

Divide the road-side laser point cloud data into a plurality of grid cells according to a preset grid cell size ⟍∧S710

Sort, if road-side laser point cloud data in one grid cell includes laser point data of an upright object by a side of the road, the laser point data of the upright object by the side of the road in ascending order of height values in the laser point data ⟍∧S810

Delete, if a difference between height values of two adjacent laser points after the sorting is greater than a preset difference threshold, the lower-ranking laser point in the two adjacent laser points and laser points following the laser point ⟍∧S820

Determine whether the smallest height value in retained laser point data of the upright object is smaller than a preset first height threshold and whether the largest height value is greater than a preset second height threshold, and obtain, if the smallest height value is smaller than the first height threshold and the largest height value is greater than the second height threshold, laser point data of one key point of the upright object based on the laser point data of the upright object retained in the grid cell ⟍∧S830

Store the extracted laser point data of the key points of target object as one piece of the positioning data of the road ⟍∧S330

FIG. 8a

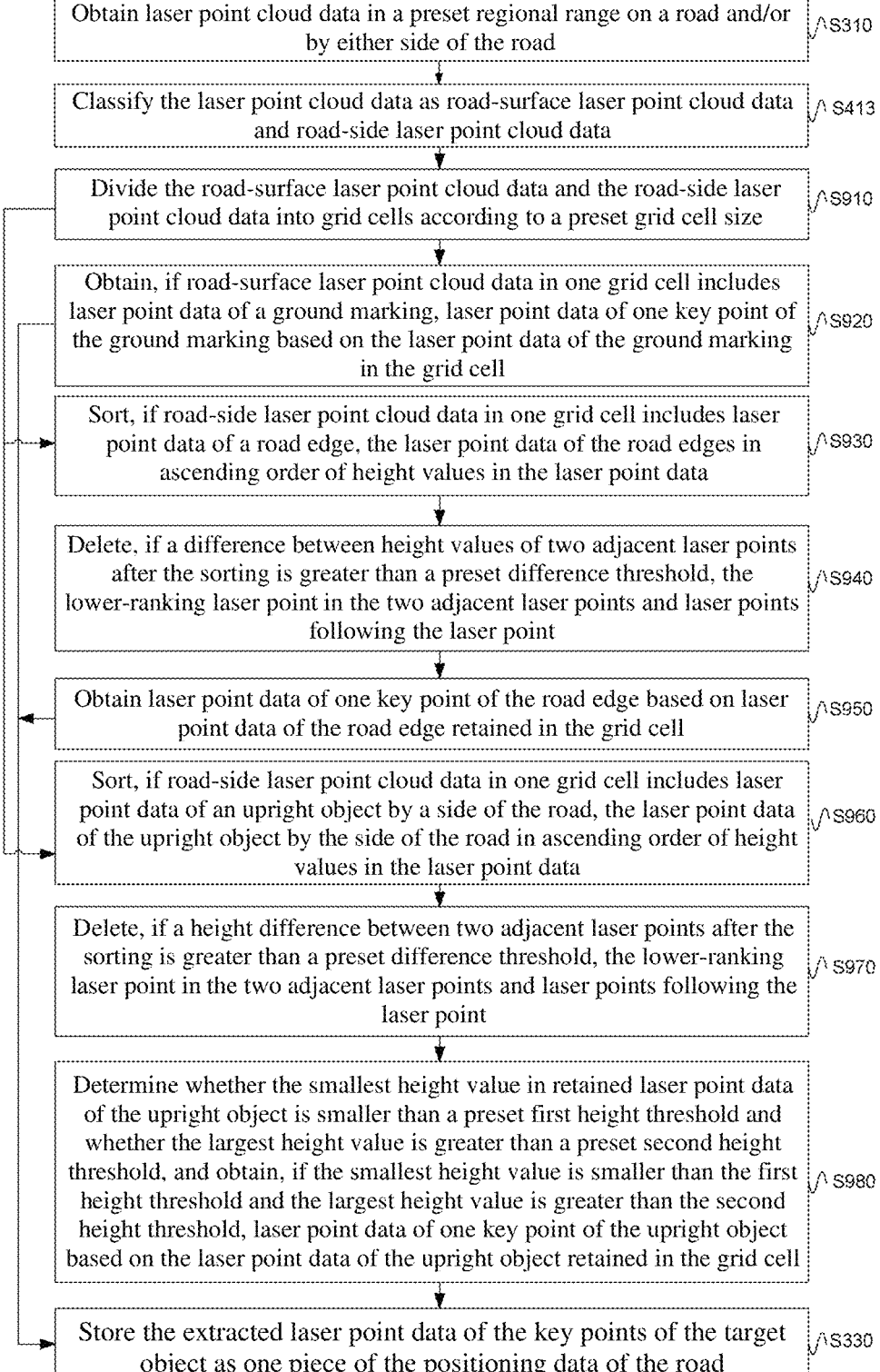

Obtain laser point cloud data in a preset regional range on a road and/or by either side of the road ∕S310

Classify the laser point cloud data as road-surface laser point cloud data and road-side laser point cloud data ∕ S413

Divide the road-surface laser point cloud data and the road-side laser point cloud data into grid cells according to a preset grid cell size ∕S910

Obtain, if road-surface laser point cloud data in one grid cell includes laser point data of a ground marking, laser point data of one key point of the ground marking based on the laser point data of the ground marking in the grid cell ∕S920

Sort, if road-side laser point cloud data in one grid cell includes laser point data of a road edge, the laser point data of the road edges in ascending order of height values in the laser point data ∕S930

Delete, if a difference between height values of two adjacent laser points after the sorting is greater than a preset difference threshold, the lower-ranking laser point in the two adjacent laser points and laser points following the laser point ∕S940

Obtain laser point data of one key point of the road edge based on laser point data of the road edge retained in the grid cell ∕S950

Sort, if road-side laser point cloud data in one grid cell includes laser point data of an upright object by a side of the road, the laser point data of the upright object by the side of the road in ascending order of height values in the laser point data ∕S960

Delete, if a height difference between two adjacent laser points after the sorting is greater than a preset difference threshold, the lower-ranking laser point in the two adjacent laser points and laser points following the laser point ∕ S970

Determine whether the smallest height value in retained laser point data of the upright object is smaller than a preset first height threshold and whether the largest height value is greater than a preset second height threshold, and obtain, if the smallest height value is smaller than the first height threshold and the largest height value is greater than the second height threshold, laser point data of one key point of the upright object based on the laser point data of the upright object retained in the grid cell ∕ S980

Store the extracted laser point data of the key points of the target object as one piece of the positioning data of the road ∕S330

POSITIONING DATA GENERATION METHOD, APPARATUS, AND ELECTRONIC DEVICE

CROSS-REFERENCE TO RELATED APPLICATIONS

This application is a continuation application of International Patent Application No. PCT/CN2019/115309, filed with the China National Intellectual Property Administration (CNIPA) on Nov. 4, 2019, which is based on and claims priority to and benefits of Chinese Patent Application No. 201811332366.3, filed on Nov. 9, 2018. The entire content of all of the above-identified applications is incorporated herein by reference.

TECHNICAL FIELD

This specification relates to the field of electronic map technologies, and in particular, to a positioning data generation method, an apparatus, and an electronic device.

BACKGROUND

In a conventional vehicle positioning method, a real-time position of a vehicle is generally obtained based on a Global Navigation Satellite System (GNSS) mounted on the vehicle, and a meter-level position accuracy is generally achieved. After a high-precision map is generated, a positioning method based on a high-precision map is emerged. In the method, when a vehicle travels, environmental information around the vehicle is obtained in real time, and the environmental information is matched with pre-constructed high-precision positioning data, to obtain a high-precision positioning result of the vehicle. The high-precision positioning result generally has a centimeter-level positioning accuracy, which can meet requirements of automatic driving. During research on the existing positioning method based on a high-precision map, the inventor found that positioning data that is applicable to high-precision positioning and is generated based on laser point cloud data plays a vital role in implementing high-precision positioning. However, a data volume of positioning data that is provided in existing technologies and is applicable to high-precision positioning is large, which is not suitable to storage and usage.

SUMMARY

This specification provides a positioning data generation method, an apparatus, and an electronic device, which can generate positioning data that is used for high-precision positioning and that does not have a large data volume.

To achieve the foregoing objectives, the following technical solutions are used in embodiments of this specification.

According to a first aspect, a positioning data generation method is provided, including:

obtaining laser point cloud data in a preset regional range on a road and/or by either side of the road;

extracting laser point data of key points of a target object on the road and/or by either side of the road from the laser point cloud data, where the target object is an easily recognizable road object with a stable attribute on the road and/or by either side of the road; and storing the extracted laser point data of the key points as positioning data of the road.

In an embodiment, a method comprises: obtaining laser point cloud data in a preset regional range on or by either side of the road; extracting laser point data of key points of a target object on or by either side of the road from the laser point cloud data, wherein the target object is a road object with a stable attribute on or by either side of the road; and storing the extracted laser point data of the key points of the target object as a piece of a plurality of pieces of positioning data of the road, the plurality of pieces of positioning data corresponding to a plurality of target objects on or by either side of the road.

In an embodiment, the extracting laser point data of key points of a target object on or by either side of the road from the laser point cloud data comprises: classifying the laser point cloud data as road-surface laser point cloud data and/or road-side laser point cloud data; and extracting laser point data of key points of target objects on the road from the road-surface laser point cloud data or target objects by either side of the road from the road-side laser point cloud data.

In an embodiment, before the extracting the laser point data of the key points of a target object, the method further comprises: fitting a road surface of the road according to the road-surface laser point cloud data; and adjusting, based on the fitted road surface, height values of laser points in the road-surface laser point cloud data or the road-side laser point cloud data to height values relative to the fitted road surface.

In an embodiment, the target object comprises a ground marking on the road, and the extracting the laser point data of the key points of the target object on the road from the road-surface laser point cloud data comprises: dividing the road-surface laser point cloud data into a plurality of grid cells according to a preset grid cell size; and if road-surface laser point cloud data in a grid cell of the plurality of grid cells comprises laser point data of the ground marking, obtaining laser point data of a key point of the ground marking based on the laser point data of the ground marking in the grid cell.

In an embodiment, the target object comprises a road edge, and the extracting the laser point data of the key points of the target object by either side of the road from the road-side laser point cloud data comprises: dividing the road-side laser point cloud data into a plurality of grid cells according to a preset grid cell size; if road-side laser point cloud data in a grid cell of the plurality of grid cells comprises laser point data of the road edge, sorting the laser point data of the road edge in ascending order of height values of laser points in the laser point data in the grid cell; if a difference between height values of two adjacent laser points after the sorting is greater than a difference threshold, updating the laser point data in the grid cell by deleting a laser point having a larger height value in the two adjacent laser points and one or more laser points following the laser point having the larger height value from the laser point data in the grid cell; and obtaining laser point data of a key point of the road edge based on the updated laser point data of the road edge in the grid cell.

In an embodiment, the target object comprises an upright object by a side of the road, and the extracting the laser point data of the key points of the target object by either side of the road from the road-side laser point cloud data comprises: dividing the road-side laser point cloud data into a plurality of grid cells according to a preset grid cell size; if road-side laser point cloud data in a grid cell of the plurality of grid cells comprises laser point data of an upright object by a side of the road, sorting the laser point data of the upright object by the side of the road in ascending order of height values of laser points in the laser point data in the grid cell; if a difference between height values of two adjacent laser points after the sorting is greater than a difference threshold, updating the laser point data in the grid cell by deleting a laser point having a larger height value in the two adjacent laser points and one or more laser points following the laser point having a larger height value from the laser point data in the grid cell; and determining whether a smallest height value in the updated laser point data of the upright object is smaller than a first height threshold and whether a largest height value in the updated laser point data of the upright object is greater than a second height threshold, and if the smallest height value is smaller than the first height threshold and the largest height value is greater than the second height threshold, obtaining laser point data of a key point of the upright object based on the updated laser point data of the upright object in the grid cell.

In an embodiment,

According to a second aspect, a positioning data generation apparatus is provided, including:

a point cloud obtaining module, configured to obtain laser point cloud data in a preset regional range on a road and/or by either side of the road;

a data extraction module, configured to extract laser point data of key points of a target object on the road and/or by either side of the road from the laser point cloud data, where the target object is an easily recognizable road object with a stable attribute on the road and/or by either side of the road; and a data storage module, configured to store the extracted laser point data of the key points as positioning data of the road.

According to a third aspect, an electronic device is provided, including:

a memory, configured to store a program; and a processor, coupled to the memory and configured to execute the program, the program, when run, performing the positioning data generation method provided in this specification.

According to a fourth aspect, a system for positioning is provided. The system comprises a processor and a non-transitory computer-readable storage medium storing instructions executable by the processor to cause the system to perform operations comprising: obtaining laser point cloud data in a preset regional range on or by either side of the road; extracting laser point data of key points of a target object on or by either side of the road from the laser point cloud data, wherein the target object is a road object with a stable attribute on or by either side of the road; and storing the extracted laser point data of the key points of the target object as a piece of a plurality of pieces of positioning data of the road, the plurality of pieces of positioning data corresponding to a plurality of target objects on or by either side of the road.

According to a fifth aspect, A non-transitory computer-readable storage medium for positioning is provided. The medium is configured with instructions executable by one or more processors to cause the one or more processors to perform operations comprising: obtaining laser point cloud data in a preset regional range on or by either side of the road; extracting laser point data of key points of a target object on or by either side of the road from the laser point cloud data, wherein the target object is a road object with a stable attribute on or by either side of the road; and storing the extracted laser point data of the key points of the target object as a piece of a plurality of pieces of positioning data of the road, the plurality of pieces of positioning data corresponding to a plurality of target objects on or by either side of the road.

This specification provides a positioning data generation method, an apparatus, and an electronic device. Laser point data of key points of a target object on a road and/or by either side of the road is extracted from obtained laser point cloud data in a preset regional range on the road and/or by either side of the road, and used as positioning data of the road for storage. Because the target object in this specification is an easily recognizable road object with a stable attribute on the road and/or by either side of the road, such a road object generally does not change as an environment changes or as time goes by. Positioning is performed by matching environmental information obtained in real time when a vehicle travels with positioning data, so as to determine a position of the vehicle. Therefore, laser point data of key points of an easily recognizable road object with a stable attribute on a road and/or by either side of the road is extracted as the positioning data, so that a positioning success rate can be ensured. In addition, in this specification, only the laser point data of the key points is extracted. Therefore, a data volume is smaller, facilitating storage and transmission of the data.

The foregoing description is merely an overview of the technical solutions of this specification. To understand the technical solutions of this specification more clearly, implementation can be performed according to embodiments of the specification. Moreover, to make the foregoing and other objectives, features, and advantages of this specification more comprehensible, embodiments of this specification are described below.

BRIEF DESCRIPTION OF THE DRAWINGS

Following detailed description of embodiments describes various advantages and benefits clearly to a person of ordinary skill in the art. The accompanying drawings are merely used for illustrating some embodiments and are not to constitute limitations on this specification. Throughout the accompanying drawings, the same reference numerals are used to represent the same components.

FIG. 2 is a structural diagram of a positioning data generation system, according to an embodiment of this specification.

FIG. 3*a* is flowchart 1 of a positioning data generation method, according to an embodiment of this specification.

FIG. 5 is flowchart 3 of a positioning data generation method, according to an embodiment of this specification.

FIG. 7*a* is flowchart 5 of a positioning data generation method, according to an embodiment of this specification.

FIG. 8*a* is flowchart 6 of a positioning data generation method, according to an embodiment of this specification.

FIG. 9*a* is flowchart 7 of a positioning data generation method, according to an embodiment of this specification.

DETAILED DESCRIPTION

Figure 1A:
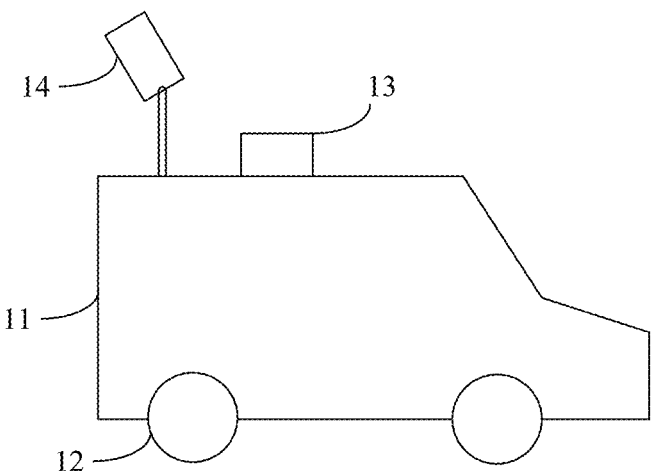
FIG. 1*a* is a schematic structural diagram of an apparatus for acquiring laser point cloud data, according to an embodiment of this specification.

The following describes details of embodiments of this specification with reference to the accompanying drawings. The accompanying drawings show some embodiments of this specification, and this specification may be implemented in various manners and is not limited by the embodiments described herein. Rather, these embodiments are provided, so that this specification is more thoroughly understood and the scope of this specification is completely conveyed to a person skilled in the art.

To implement high-precision positioning of an automobile, positioning data used in a high-precision positioning scenario needs to be generated, and the positioning data needs to meet the following several requirements.

Information amount: An information amount of the positioning data needs to be rich enough to represent a road on which the automobile travels and an environment around the automobile, as vivid as possible.

Data volume: A data volume of the positioning data needs to be as small as possible, so as to facilitate the storage and transmission.

Robustness: The positioning data is robust enough to external environments such as lighting, time, seasons, climate, and road conditions, and is not prone to the impact of changes in the external environments.

In comprehensive consideration of the foregoing requirements, this specification provides a positioning data generation method. The method includes:

obtaining laser point cloud data in a preset regional range on a road and/or by either side of the road;

extracting laser point data of key points of a target object on the road and/or by either side of the road from the laser point cloud data, where the target object is an easily recognizable road object with a stable attribute on the road and/or by either side of the road; and storing the extracted laser point data of the key points of the target object as a piece of a plurality of pieces of positioning data of the road, the plurality of pieces of positioning data corresponding to a plurality of target objects on or by either side of the road.

During an actual application, the easily recognizable road object with a stable attribute on the road and/or by either side of the road may be a ground marking, a road edge, or an upright object by a side of the road.

The ground marking may be any marking on a road surface, such as a lane line, a road direction arrow, or a crosswalk. The road edge may be formed by curbs, guard rails, or green belts. The upright object by a side of the road may be an upright object by either side of the road, such as a pole (a support pole of a traffic sign, a street lamp, or a traffic light), a tree trunk, or a wall by either side of the road.

A target object such as a ground marking, a road edge, or an upright object by a side of the road is not prone the impact of external environments such as lighting, time, seasons, climate, and road conditions. Positioning is matching environmental information obtained in real time in a when a vehicle travels with positioning data, so as to determine a position of the vehicle. Therefore, laser point data of key points of an easily recognizable road object with a stable attribute on a road and/or by either side of the road is extracted as the positioning data to ensure a positioning success rate. In addition, in this specification, only the laser point data of the key points is extracted. Therefore, a data volume is smaller, facilitating the storage and transmission of the data.

FIG. 1*a* is a schematic structural diagram of an apparatus for acquiring laser point cloud data, according to an embodiment of this specification. The apparatus includes: an acquiring vehicle body 11, wheels 12 provided with a revolution counter, an integrated positioning system 13 integrated with an inertial measurement unit (IMU) and a GNSS, and a laser radar 14 configured to acquire laser point cloud data. The apparatus structure shown in FIG. 1*a* can acquire laser point cloud data of all objects on a road and two sides of the road where the acquiring vehicle has traveled. The positioning data with a smaller data volume and a high positioning success rate can be obtained by processing the acquired laser point cloud data using the technical solution for generating positioning data shown in FIG. 1*b*.

Figure 1B:
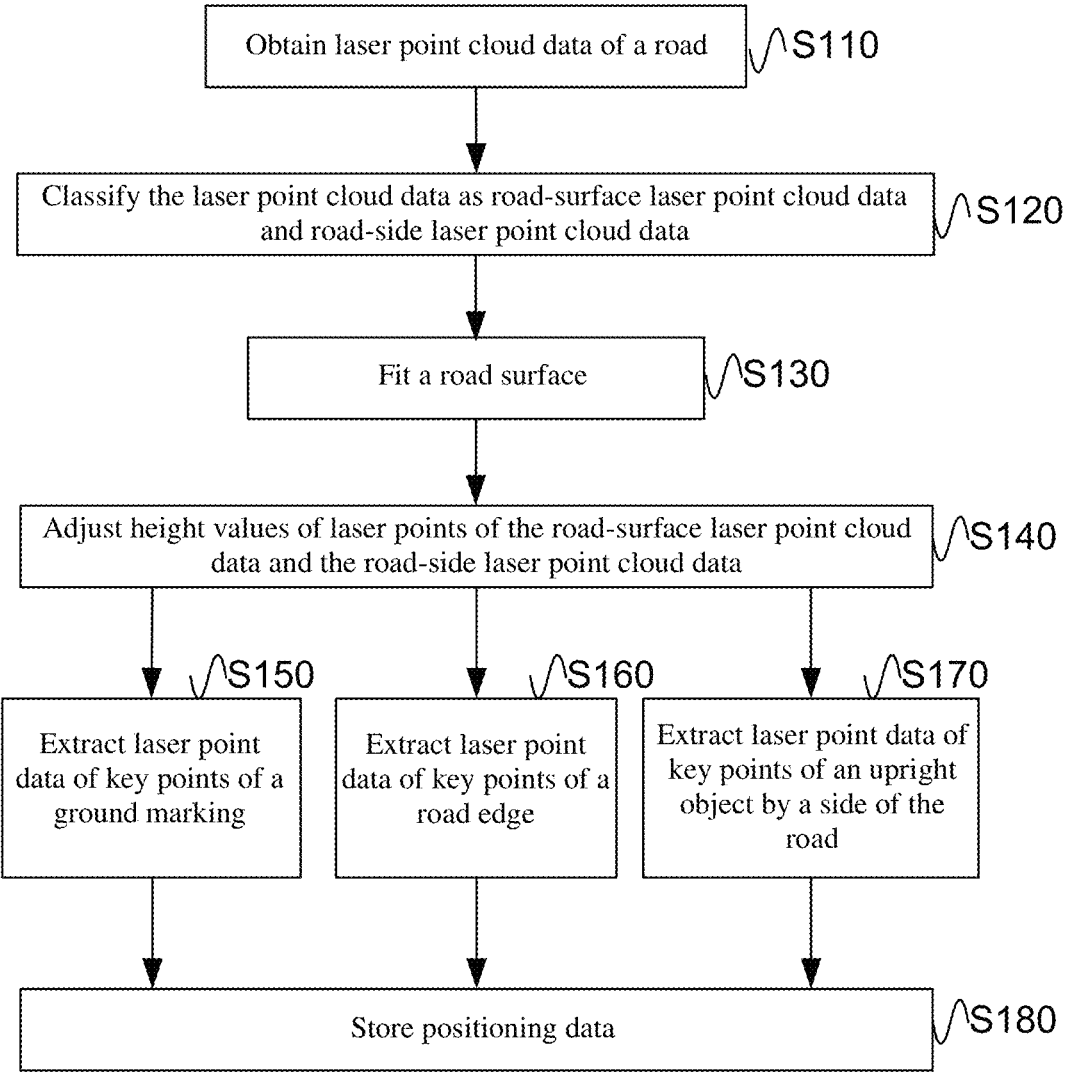
FIG. 1*b* is a schematic diagram of a technical solution for generating positioning data, according to an embodiment of this specification.

As shown in FIG. 1*b*, the technical solution for generating positioning data includes the following technical features.

S110. Obtaining laser point cloud data of a road. The laser point cloud data includes laser point data in a preset regional range on the road and/or by either side of the road.

S120. Classifying the laser point cloud data as road-surface laser point cloud data and/or road-side laser point cloud data.

The process of classifying the laser point cloud data into laser point cloud data on a road surface, on the left side of the road, and/or on the right side of the road may include obtaining ground catastrophe points corresponding to scan lines of laser points obtained by scanning of a laser radar, and boundary positions of laser point clouds on the road surface and/or on two sides of the road can be distinguished according to the catastrophe points. If the laser point cloud data obtained in step S110 includes both the laser point data in the preset regional range on the road and by either side of the road, the road-surface laser point cloud data and the road-side laser point cloud data may be obtained in step S120. If the laser point cloud data obtained in step S110 includes the laser point data in the preset regional range only on the road or only by either side of the road, the road-surface laser point cloud data or the road-side laser point cloud data may be obtained in step S120.

S130. Fitting a road surface. Plane fitting is performed on the road-surface laser point cloud data by using a random sample consensus (RANSAC) algorithm, to obtain a road surface.

S140. Adjusting, based on the fitted road surface, height values of laser points in the road-surface laser point cloud data and/or the road-side laser point cloud data to height values relative to the road surface.

If a height coordinate value Z of each laser point in the inputted laser point cloud data is already a value Z relative to the road surface, step 130 and step 140 may be omitted. Next, laser point data of key points of a target object on the road and/or by either side of the road is correspondingly extracted from the road-surface laser point cloud data and/or road-side laser point cloud data.

The extracting laser point data of key points of a target object on the road and/or by either side of the road includes followings.

S150. Extracting laser point data of key points of a ground marking. Laser point data of key points of a ground marking is extracted from the road-surface laser point cloud data.

S160. Extracting laser point data of key points of a road edge. Laser point data of key points of a road edge is extracted from the road-side laser point cloud data.

S170. Extracting laser point data of key points of an upright object by a side of the road. Laser point data of key points of an upright object by a side of the road is extracted from the road-side laser point cloud data.

S180. Storing the extracted laser point data of the key points as positioning data of the road.

Laser point cloud data of key points of a ground marking, key points of a road edge, and key points of an upright object by a side of the road that is extracted from the laser point cloud data is stored as the positioning data. In this specification, the stored positioning data may include the laser point cloud data of the key points of at least one of the ground marking, the road edge, and the upright object by a side of the road.

Based on the technical solution for generating positioning data shown in FIG. 1b, FIG. 2 is a structural diagram of a positioning data generation system, according to an embodiment of this specification. As shown in FIG. 2, the system includes an apparatus 210 for acquiring laser point cloud data and a positioning data generation apparatus 220.

The apparatus 210 for acquiring laser point cloud data may be, but is not limited to, the apparatus structure shown in FIG. 1a, and is configured to acquire laser point cloud data on a road and/or by either side of the road.

The positioning data generation apparatus 220 is configured to obtain laser point cloud data in a preset regional range on the road and/or by either side of the road from laser point cloud data acquired by the apparatus 210 for acquiring laser point cloud data, extract laser point data of key points of a target object on the road and/or by either side of the road from the obtained laser point cloud data, and used as positioning data of the road for storage. The target object is an easily recognizable road object with a stable attribute on the road and/or by either side of the road. For example, the target object may be at least one road object among a ground marking on the road, a road edge, and an upright object by a side of the road, and such a road object generally does not change as an environment changes or as time goes by. A positioning success rate can be ensured by using laser point data of key points of such a target object as positioning data of the road. In addition, in this specification, only the laser point data of the key points is extracted. Therefore, a data volume is smaller, facilitating the storage and transmission of the data. The technical solutions of this specification are further described by using a plurality of embodiments below.

Embodiment 1

Based on the concept of the solution for generating positioning data, FIG. 3a is flowchart 1 of a positioning data generation method, according to an embodiment of this specification, and an execution entity of the method may be the positioning data generation apparatus 220 shown in FIG. 2. As shown in FIG. 3a, the positioning data generation method may include the following steps.

S310. Obtaining laser point cloud data in a preset regional range on a road and/or by either side of the road;

Laser point cloud data in a preset regional range on a road and/or by either side of the road is obtained from the laser point cloud data acquired by the apparatus 210.

Generally, a laser point cloud at an extremely far position (tens of meters to hundreds of meters) may be obtained through laser radar scanning, and the precision of a laser point cloud far away from an acquisition site is lower, and is not a laser point at a road position. Therefore, during acquisition of the laser point cloud data, an acquiring vehicle body may be used as a center, and the acquired laser point cloud far away from the acquiring vehicle body is directly filtered out only to limit a range to reduce the redundancy of the laser point cloud data. Next, the obtained laser point clouds that are consecutive in a road traveling direction and are non-redundant are spliced together to construct the laser point cloud data processed in step S310. In this case, the laser point cloud data belongs to the ground or does not belong to the ground is not distinguished.

Figure 3B:
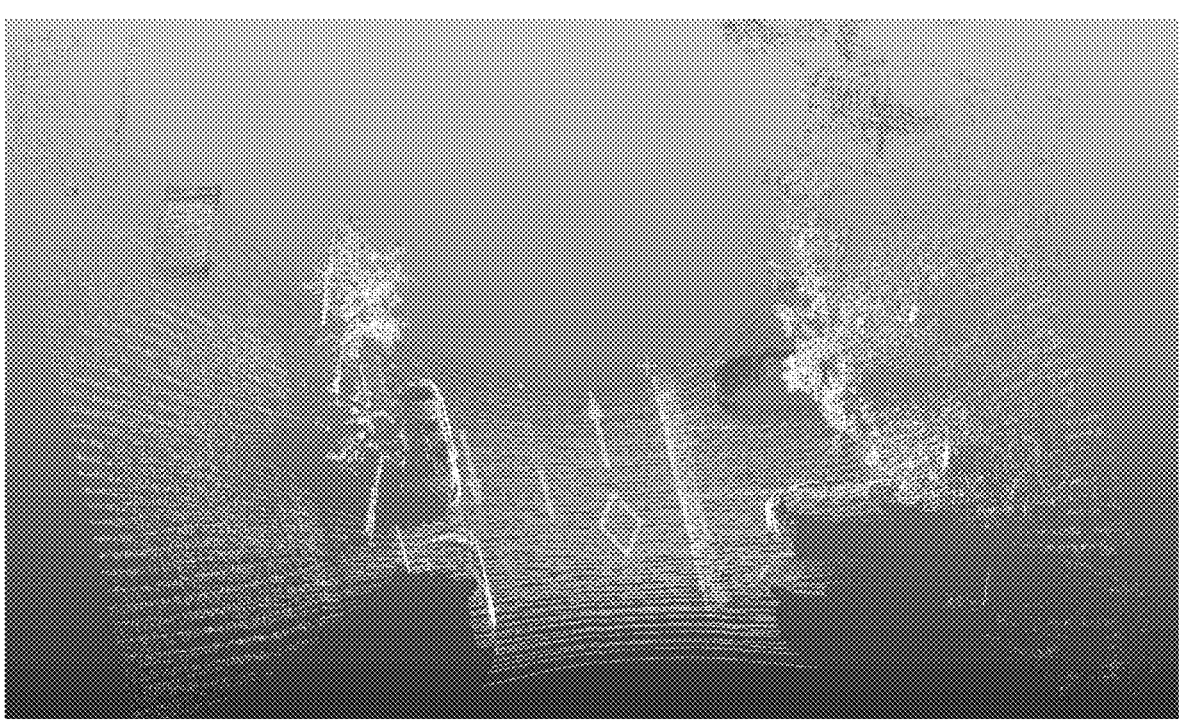
FIG. 3*b* is a schematic diagram of a laser point cloud, according to an embodiment of this specification.

During the actual processing of the laser point cloud data, laser point cloud data on a road and by either side of the road may be divided into several regions in advance in a road direction according to a preset regional range. Each time, the laser point cloud data in one regional range is obtained, and is subject to subsequent data processing. FIG. 3b is a laser point cloud map of laser point cloud data in one preset regional range. Each piece of laser point data in the figure includes three-dimensional coordinates (x, y, z), and a brightness degree of each laser point represents the reflectivity of the laser point, where the reflectivity of a laser point on the road surface in a middle region is higher than the reflectivity of a laser point by either side of the road.

S320. Extracting laser point data of key points of a target object on the road and/or by either side of the road from the laser point cloud data, where the target object is an easily recognizable road object with a stable attribute on the road and/or by either side of the road.

The target object may include, but is not limited to: a ground marking, a road edge, and an upright object by a side of the road. Correspondingly, laser point data of key points of a target object may be laser point data of key points that is extracted from laser point cloud data of the target object, where the key points are key points that can reflect morphological features of the target object to the greatest extent.

For example, laser point data of key points of a ground marking, a road edge, an upright object by a side of the road, and the like may be extracted from laser point cloud data in a preset regional range on the road and/or by either side of the road by combining reflectivity of laser points and three-dimensional coordinates (especially height values of the laser points).

S330. Storing the extracted laser point data of the key points of the target object as a piece of a plurality of pieces of positioning data of the road, the plurality of pieces of positioning data corresponding to a plurality of target objects on or by either side of the road.

After the laser point data of the key points of the target object (such as a ground marking, a road edge, or an upright object by a side of the road) on the road and/or by either side of the road is extracted from the laser point cloud data, the laser point data may be used as the positioning data of the road in the preset regional range for storage.

Embodiment 2

Figure 4A:
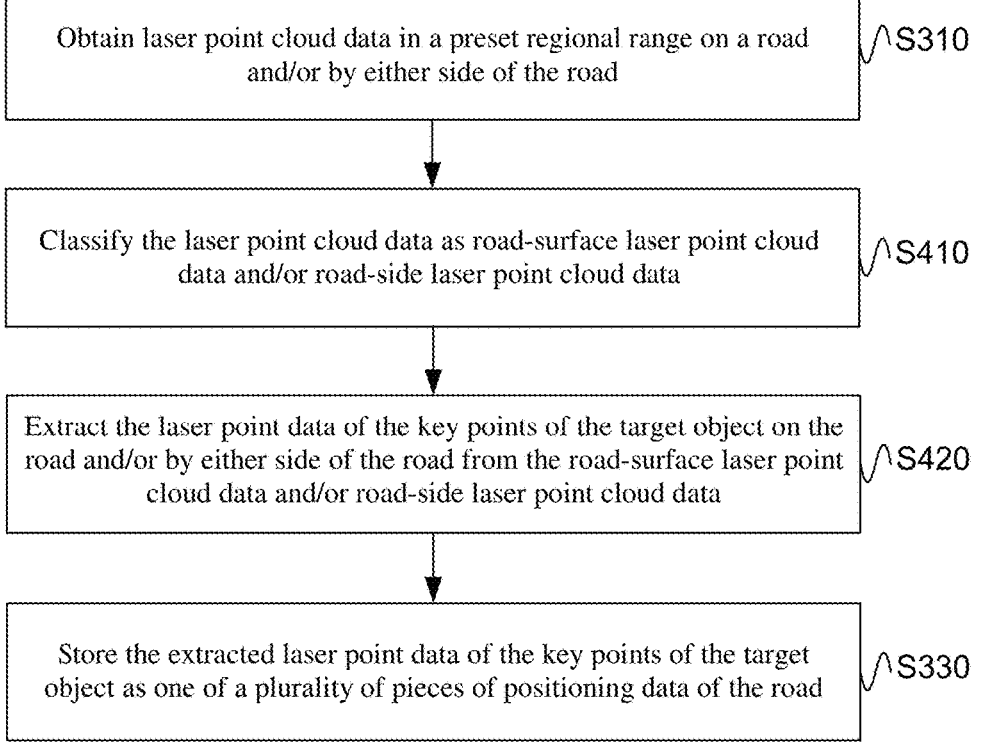
FIG. 4*a* is flowchart 2 of a positioning data generation method, according to an embodiment of this specification.

FIG. 4a is flowchart 2 of a positioning data generation method, according to an embodiment of this specification. A difference between this embodiment and the method shown in FIG. 3a lies in that, this embodiment uses an implementation of extracting laser point data of key points of a target object on the road and/or by either side of the road from the laser point cloud data. As shown in FIG. 4a, the following steps are performed after step S310 in this embodiment.

S410. Classifying the laser point cloud data as road-surface laser point cloud data and/or road-side laser point cloud data.

For example, the laser point cloud data in the preset regional range is classified as road-surface laser point cloud data and/or road-side (including the left side and the right side of the road) laser point cloud data according to positions of three-dimensional coordinate values and features of changes of the height values (Z values in three-dimensional coordinates).

In an actual application scenario, a height catastrophe point of a laser point cloud is found from each laser radar scan line. For example, in laser point cloud data in one grid cell, when a laser point height difference between the highest point and the lowest point in a laser point cloud on the scan line is greater than a specific threshold, for example, 0.1 m, it is considered that a height catastrophe point of the laser point cloud on the scan line exists in the grid cell. In another example, in laser point cloud data in two adjacent grid cells, when a height difference between the highest point and the lowest point in a laser point cloud on the scan line is greater than a specific threshold, it may also be considered that a height catastrophe point of the laser point cloud on the scan line exists in the two grid cells. Height catastrophe points in laser point clouds on scan lines are recognized by extending the scan lines from middle positions of the scan lines corresponding to the laser point cloud data in the preset regional range toward two sides, and further laser point cloud data on one scan line may be divided into the road-surface laser point cloud data and/or the road-side laser point cloud data.

For each scan line, the scan line is approximately perpendicular to a traveling direction of the vehicle, and the scan line is extended from the middle of the scan line toward the left side and the right side, to find height catastrophe points of laser point clouds on scan lines on the left side and the right side, thereby implementing division of road-surface laser point cloud data and road-side laser point cloud data on one scan line. The same operation is performed on a plurality of scan lines, to divide the laser point cloud data in the preset regional range into the road-surface laser point cloud data and/or the road-side laser point cloud data.

Figure 4B:
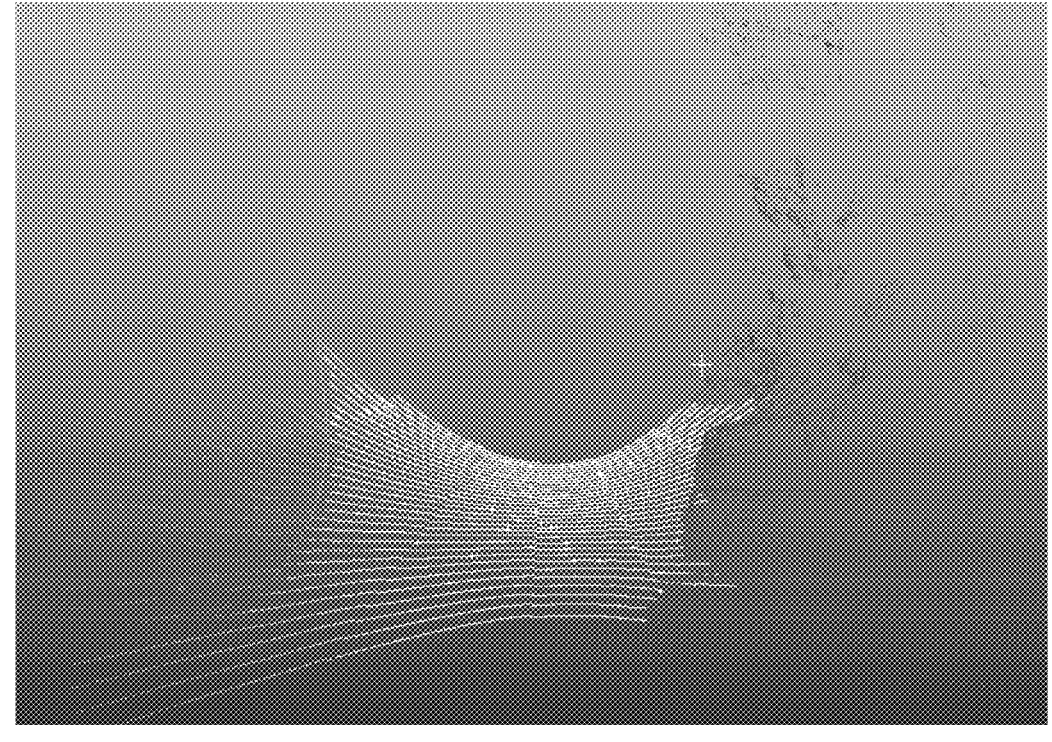
FIG. 4*b* is a scan line map of an original laser point cloud, according to an embodiment of this specification.

As shown in FIG. 4b, each scan line is approximately a circular arc line when viewed from the left to the right, and a position point in the middle of the scan line is a position of a laser point that the vehicle has passed or is about to pass. The laser point is certainly a laser point on the road surface. The scan line is extended from the middle toward two sides. If a height change value of two adjacent laser points is greater than a height threshold, it is considered that a position of the laser point is at a road edge, and the extension is stopped. Laser point clouds on the scan line are divided from the positions at the road edge. Scan lines of all laser point clouds in the preset regional range are divided, to obtain the laser point cloud data in three regions shown in FIG. 4b, which are, sequentially from left to right, laser point cloud data by the left side of the road, road-surface laser point cloud data, and laser point cloud data by the right side of the road.

S420. Extracting the laser point data of the key points of the target object on the road and/or by either side of the road from the road-surface laser point cloud data and/or road-side laser point cloud data.

After the laser point cloud data is divided into different regions, laser point data of key points of target objects may be extracted from the laser point cloud data corresponding to different regions. For example, laser point data of key points of a ground marking is extracted from the road-surface laser point cloud data, and laser point data of key points of a road edge and an upright object is extracted from the road-side laser point cloud data.

In addition, as shown in FIG. 5, before step S420 is performed, the following steps may further be performed, so that height correction is performed on the laser point cloud data according to a fitted road surface.

S510. Fitting a road surface of the road according to the road-surface laser point cloud data.

For example, plane fitting may be performed on the road-surface laser point cloud data by using a RANSAC algorithm, to obtain a road surface of the road.

For example, a horizontal plane may be fitted specific to the road-surface laser point cloud data by using a RANSAC plane fitting algorithm, and a part of the horizontal plane located in a road region is the road surface. Specific fitting steps are as follows:

(a) randomly extracting three data points $P_1$, $P_2$, and $P_3$ from the road-surface laser point cloud data;

(b) generating a plane by using the three data points, calculating distances between all pieces of road-surface laser point data and the plane, and calculating a quantity of laser points in a specific distance range (for example, 5 cm); and (c) repeating the foregoing steps several times, and determining a plane formed by three points having the largest quantity of road-surface laser point data in a specific distance range of the plane formed by the three points as a horizontal plane. A part of the horizontal plane located in a road region is the road surface.

S520. Adjusting, based on the fitted road surface, height values of the road-surface laser point cloud data and the road-side laser point cloud data to a height value relative to the road surface.

For example, if a height value of the road surface is set to height 0, height values of the road-surface laser point cloud data and the road-side laser point cloud data may be adjusted to a distance between the corresponding laser points and the road surface.

In addition, if a value Z in the inputted laser point cloud data is already a value Z relative to the road surface, step S510 and step S520 do not need to be performed.

Based on the embodiment shown in FIG. 3*a*, in this embodiment, the laser point cloud data is further classified as the road-surface laser point cloud data and/or road-side laser point cloud data. Next, the laser point data of the key points of the target object on the road and/or by either side of the road is extracted from the road-surface laser point cloud data and/or road-side laser point cloud data, thereby conveniently and quickly obtaining the laser point data of the key points of the target object.

In addition, before the laser point data of the key points of the target object on the road and/or by either side of the road is extracted, a road surface of the road is fitted by using the road-surface laser point cloud data, and height values of the road-surface laser point cloud data and the road-side laser point cloud data are corrected/adjusted to height values relative to the road surface based on the fitted road surface, thereby ensuring the accuracy of height positions of the laser point cloud data.

Embodiment 3

Figure 6:
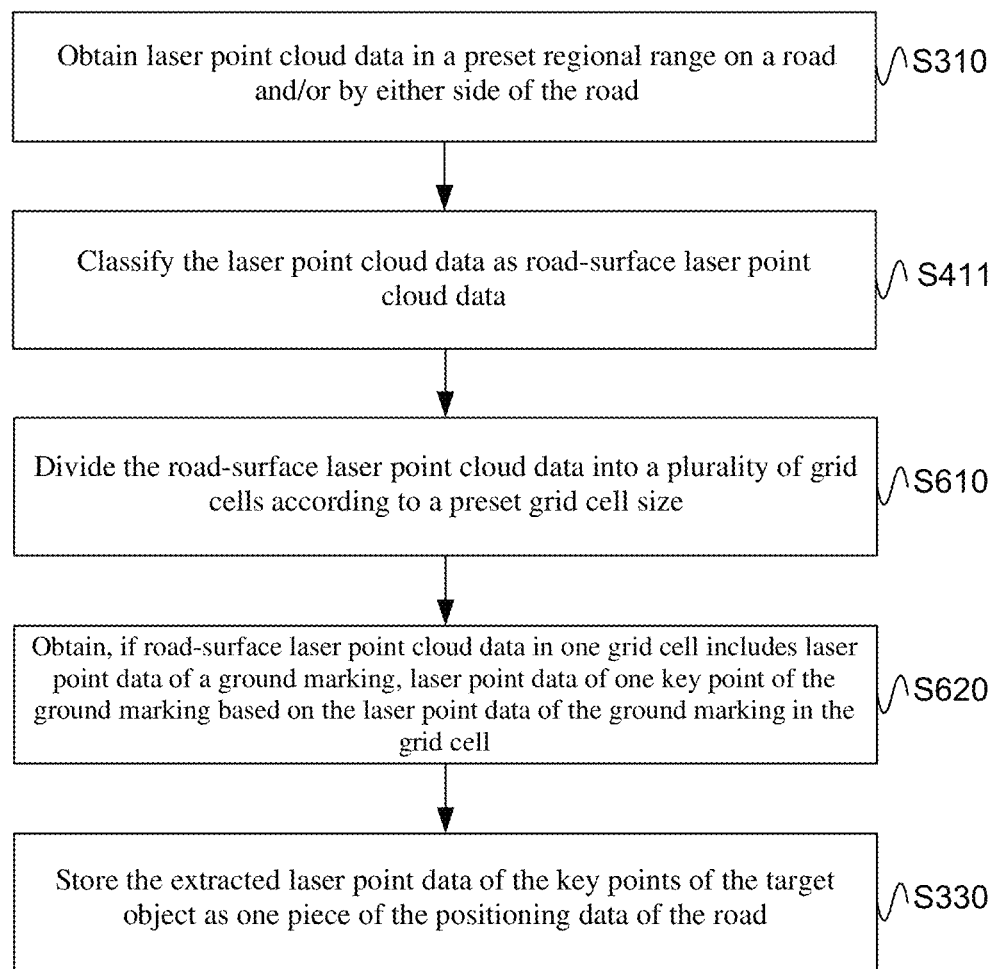
FIG. 6 is flowchart 4 of a positioning data generation method, according to an embodiment of this specification.

FIG. 6 is flowchart 4 of a positioning data generation method, according to an embodiment of this specification. A difference between this embodiment and the method shown in FIG. 4*a* lies in that, this embodiment uses an implementation of extracting laser point data of key points of a target object on the road from the road-surface laser point cloud data when the target object is a ground marking on the road. As shown in FIG. 6, the following steps are performed after step S310 in this embodiment.

S411. Classifying the laser point cloud data as road-surface laser point cloud data.

This step may be a specific classification manner of classifying the laser point cloud data in step S410.

S610. Dividing the road-surface laser point cloud data into a plurality of grid cells according to a preset grid cell size.

Preset grid cells may be two-dimensional grid cells set on the horizontal plane, and the entire road-surface laser point cloud data may be divided into different grid cells according to projection relationships between the road-surface laser point cloud data and the grid cells.

S620. Obtaining, if road-surface laser point cloud data in one grid cell includes laser point data of a ground marking, laser point data of one key point of the ground marking based on the laser point data of the ground marking in the grid cell.

In the road-surface laser point cloud data, the reflectivity of a laser point cloud of a ground marking and the reflectivity of a laser point cloud of a non-ground marking differ greatly. Generally, a ground region having a ground marking corresponds to a lane line, an arrow, a crosswalk, or the like on the road. Therefore, compared with a laser point cloud of another ground region of a non-ground marking, the reflectivity of a laser point cloud of the ground region is higher. Based on this feature, the laser point data of ground markings may be extracted from the road-surface laser point cloud data.

For example, a quantity of laser points in each grid cell, and an average value and a variance of reflectivity of the laser points may be calculated. Next, laser point data meeting a quantity threshold, and an average value threshold and a variance threshold of reflectivity specified in a preset condition is determined as the laser point data of the ground marking.

For example, a preset condition may be set according to features, learned in advance or obtained through experiences, of the laser points in grid cells including ground markings. The preset condition may specify indicators such as a quantity threshold of laser points in a grid cell that includes a ground marking and an average value threshold and a variance threshold of reflectivity of the laser points. When the laser points in a to-be-processed grid cell meet the specifications of the preset condition, the said laser points are determined as the laser points of the ground marking. For example, if a quantity of laser points in a grid cell and an average value and a variance of reflectivity of the laser points satisfy the specified preset conditions, and the reflectivity of current laser points is greater than the average value by a designated exceeding value, the laser points may be determined as the laser points of the ground marking.

If the road-surface laser point cloud data in one grid cell includes laser point data of a ground marking, laser point data of one key point of the ground marking may be obtained based on the laser point data of the ground marking in the grid cell. For example, when there are a plurality of pieces of laser point data of a ground marking in one grid cell, laser point data of one key point of the ground marking may be obtained based on an average value of the plurality of pieces of laser point data. For example, average values of coordinates (xyz) in the laser point data are calculated, and the obtained average values of the coordinates are then used as the coordinates of the laser point data of the key point of the ground marking.

Based on the embodiment shown in FIG. 4*a*, in this embodiment, the target object is further determined as a ground marking on the road, and the road-surface laser point cloud data is divided into grid cells according to a preset grid cell size. When it is determined that the road-surface laser point cloud data in one grid cell includes laser point data of a ground marking, the laser point data of one key point of the ground marking is obtained based on the laser point data of the ground marking in the grid cell, thereby conveniently and quickly obtaining the laser point data of key points of the ground markings.

Embodiment 4

FIG. 7*a* is flowchart 5 of a positioning data generation method, according to an embodiment of this specification. A difference between this embodiment and the method shown in FIG. 4*a* lies in that, this embodiment uses an implementation of extracting laser point data of key points of a target object by either side of the road from the road-side laser point cloud data when the target object is a road edge. As shown in FIG. 7*a*, the following steps are performed after step S310 in this embodiment.

S412. Classifying the laser point cloud data as road-side laser point cloud data.

This step may be a specific classification manner of classifying the laser point cloud data in step S410.

S710. Dividing the road-side laser point cloud data into grid cells according to a preset grid cell size.

Preset grid cells may be two-dimensional grid cells set on the horizontal plane, and the entire road-side laser point cloud data may be divided into different grid cells according to projection relationships between the road-side laser point cloud data and the grid cells.

S720. Sorting, if road-side laser point cloud data in one grid cell includes laser point data of a road edge, the laser point data of the road edges in ascending order of height values of laser points in the laser point data.

Laser point data near a region joined to the road in laser point cloud data of the left side of the road is marked as laser point data of a left edge of the road, and laser point data near a region joined to the road in laser point cloud data of the right side of the road is marked as laser point data of a right edge of the road.

In an actual application scenario, laser point data near a region closest to a traveling trajectory of an acquiring vehicle may be separately obtained from the left side of the road and the right side of the road, and used as the laser point data of a road edge.

Figure 7B:
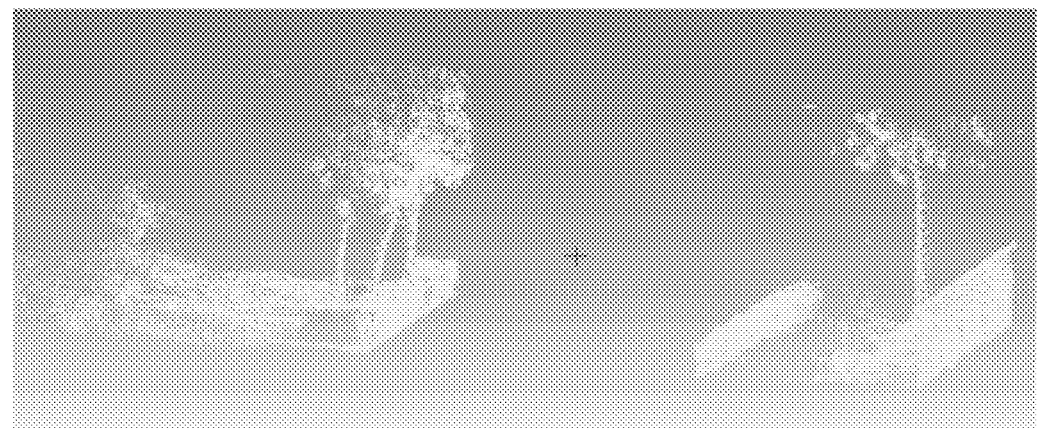
FIG. 7*b* is an original laser point cloud map of regions on two sides of a road, according to an embodiment of this specification.

As shown in FIG. 7b, for laser point cloud data on two sides of the road, laser point data near boundary points closest to the road may be extracted from regions on the two sides, and used as laser point data of road edges.

When road-side laser point cloud data in one grid cell includes laser point data of a road edge, the laser point data of the road edge is sorted in ascending order of height values of laser points in the laser point data. During the sorting, laser point data of the left road edge and laser point data of the right road edge may be sorted separately, or the laser point data of the road edges may be sorted together.

S730. Deleting, if a difference between height values of two adjacent laser points after the sorting is greater than a preset difference threshold, the lower-ranking laser point (i.e., the laser point having a larger height value) in the two adjacent laser points and laser points following that laser point.

In an actual application scenario, if a difference between height values of two adjacent laser points after the sorting is greater than a preset difference threshold, it indicates that the two laser points may be located on the boundary between the road and regions on two sides of the road. The lower-ranking laser point in the two laser points and laser points following that laser point may correspond to boundary positions where heights change abruptly such as curbs, guard rails, or green belts on two sides of the road, or suspension points. In this case, the lower-ranking laser point in the two adjacent laser points and laser points following the laser point, that is, laser point data of a road edge far away from the road may be deleted, and the higher-ranking laser point (i.e., the laser point having a smaller height value) in the two adjacent laser points and laser points in front of the laser point, that is, laser point data of a road edge close to the road are retained, to ensure the quality of data to be processed subsequently, and reduce a volume of the data to be processed.

S740. Obtaining laser point data of one key point of the road edge based on laser point data of the road edge retained in the grid cell.

For example, any one piece of laser point data can be selected from laser point data of the road edge retained in the grid cell and used as laser point data of a key point. Alternatively, when there are a plurality of pieces of laser point data of a road edge retained in one grid cell, laser point data of one key point of the road edge may be obtained based on average values of the plurality of pieces of laser point data. For example, average values of coordinates (xyz) in the laser point data are calculated, and the obtained average values of coordinates are then used as coordinates of the laser point data of the key point of the road edge.

Based on the embodiment shown in FIG. 4a, in this embodiment, the target object is further determined as a road edge, and the road-side laser point cloud data is divided into grid cells according to a preset grid cell size. When it is determined that road-side laser point cloud data in one grid cell includes laser point data of a road edge, the laser point data of the road edge is sorted in ascending order of height value in the laser point data. If a difference between height values of two adjacent laser points after the sorting is greater than a preset difference threshold, the lower-ranking laser point in the two adjacent laser points and laser points following the laser point are deleted. Finally, laser point data of one key point of the road edge is obtained based on laser point data of the road edge retained in the grid cell, thereby conveniently and quickly obtaining laser point data of key points of a road edge.

Embodiment 5

FIG. 8a is flowchart 6 of a positioning data generation method, according to an embodiment of this specification. A difference between this embodiment and the method shown in FIG. 4a lies in that, this embodiment uses an implementation of extracting laser point data of key points of a target object by either side of the road from the road-side laser point cloud data when the target object is an upright object by a side of the road. As shown in FIG. 8a, the following steps are performed after step S310 in this embodiment.

S412. Classifying the laser point cloud data as road-side laser point cloud data.

This step may be a specific classification manner of classifying the laser point cloud data in step S410.

S710. Dividing the road-side laser point cloud data into grid cells according to a preset grid cell size.

Preset grid cells may be two-dimensional grid cells set on the horizontal plane, and the entire road-side laser point cloud data may be divided into different grid cells according to projection relationships between the road-side laser point cloud data and the grid cells.

S810. Sorting, if road-side laser point cloud data in one grid cell includes laser point data of an upright object by a side of the road, the laser point data of the upright object by the side of the road in ascending order of height values in the laser point data.

For example, laser point data having heights meeting a preset height range may be extracted from the laser point cloud data on the left side of the road and the right side of the road, and used as laser point data of an upright object by a side of the road.

For example, a height threshold (for example, the height threshold is greater than 0.5 m and smaller than 2.5 m) may be set in advance, to delete laser point cloud data by either side of the road exceeding the height threshold, and the remaining laser point cloud data is selected as laser point data of an upright object by a side of the road.

Figure 8B:
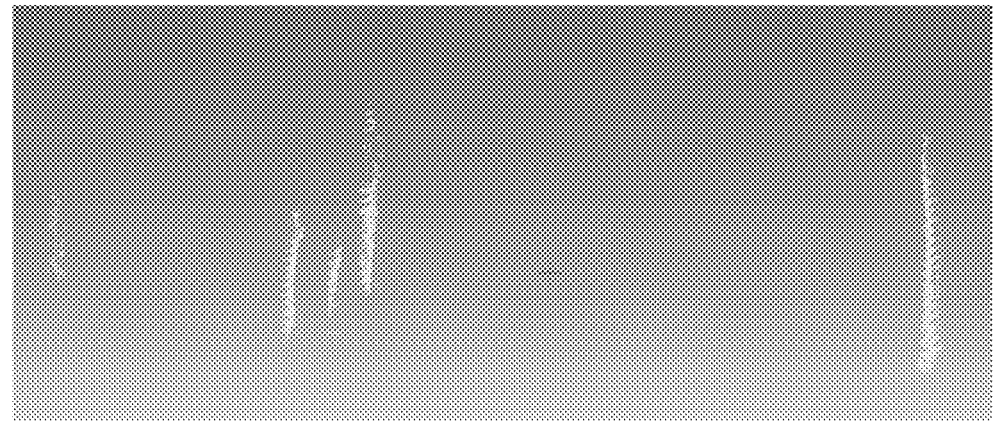
FIG. 8*b* is a laser point cloud map of upright object points on two sides of a road, according to an embodiment of this specification.

FIG. 8b shows laser point cloud data of upright objects by either side of the road that is extracted from two sides of the road.

When road-side laser point cloud data in one grid cell includes laser point data of an upright object by a side of the road, the laser point data of the upright object by a side of the road is extracted in ascending order of height values in the laser point data. During the sorting, laser point data of an upright object on the left side of the road and laser point data of an upright object on the right side of the road may be sorted separately or may be sorted together.

S820. Deleting, if a height difference between two adjacent laser points after the sorting is greater than a preset difference threshold, the lower-ranking laser point in the two adjacent laser points and laser points following the laser point.

In an actual application scenario, if a difference between height values of two adjacent laser points after the sorting is greater than a preset difference threshold, it indicates that the two laser points may be located on edges of two upright objects in a road-side region. The lower-ranking laser point in the two laser points and laser points following the laser point may correspond to positions where heights change abruptly such as a pole (a support pole of a traffic sign, a street lamp, or a traffic light), a tree trunk, or a wall, or suspension points. In this case, the lower-ranking laser point in the two adjacent laser points and laser points following the laser point may be deleted, and the higher-ranking laser point in the two adjacent laser points and laser points in front of the laser point are retained, to ensure the quality of data to be processed subsequently, and reduce a volume of the data to be processed.

S830. Determining whether the smallest height value in retained laser point data of the upright object is smaller than a preset first height threshold and whether the largest height value is greater than a preset second height threshold, and obtaining, if the smallest height value is smaller than the first height threshold and the largest height value is greater than the second height threshold, laser point data of one key point of the upright object based on the laser point data of the upright object retained in the grid cell.

The first height threshold is smaller than the second height threshold.

In this step, it is further determined whether the upright object corresponding to the retained laser point data of the upright object still meets a specific height range. If the corresponding upright object still meets the specific height range, the laser point data of one key point of the upright object is obtained based on the laser point data of the upright object retained in the grid cell.

For example, any one piece of laser point data may be selected from laser point data of the upright object retained in the grid cell and used as laser point data of a key point. Alternatively, when there are a plurality of pieces of laser point data of the upright object retained in one grid cell, laser point data of one key point of the upright object may be obtained based on average values of the plurality of pieces of laser point data. For example, average values of coordinates (xyz) in the laser point data are calculated, and obtained average values of the coordinates are then used as coordinates of the laser point data of the key point of the upright object.

Based on the embodiment shown in FIG. 4a, in this embodiment, the target object is further determined as an upright object by a side of the road, and the road-side laser point cloud data is divided into grid cells according to a preset grid cell size. When it is determined that road-side laser point cloud data in one grid cell includes laser point data of an upright object by a side of the road, the laser point data of the upright object by a side of the road is sorted in ascending order of height value in the laser point data. If a difference between height values of two adjacent laser points after the sorting is greater than a preset difference threshold, the lower-ranking laser point in the two adjacent laser points and laser points following the laser point are deleted. Finally, whether the smallest height value in retained laser point data of the upright object is smaller than a preset first height threshold and whether the largest height value is greater than a preset second height threshold are determined, and if the smallest height value is smaller than the first height threshold and the largest height value is greater than the second height threshold, laser point data of one key point of the upright object is obtained based on the laser point data of the upright object retained in the grid cell, thereby conveniently and quickly obtaining laser point data of key points of upright objects by a side of the road.

Embodiment 6

FIG. 9a is flowchart 7 of a positioning data generation method, according to an embodiment of this specification. A difference between this embodiment and the method shown in FIG. 4a lies in that, this embodiment uses an implementation of extracting laser point data of key points of a target object on the road and by either side of the road from the road-surface laser point cloud data and the road-side laser point cloud data when the target object includes a ground marking, a road edge, and an upright object by a side of the road. As shown in FIG. 9a, the following steps are performed after step S310 in this embodiment.

S413. Classifying the laser point cloud data as road-surface laser point cloud data and road-side laser point cloud data.

This step may be a specific classification manner of classifying the laser point cloud data in step S410.

S910. Dividing the road-surface laser point cloud data and the road-side laser point cloud data into grid cells according to a preset grid cell size.

S920. Obtaining, if road-surface laser point cloud data in one grid cell includes laser point data of a ground marking, laser point data of one key point of the ground marking based on the laser point data of the ground marking in the grid cell.

S930. Sorting, if road-side laser point cloud data in one grid cell includes laser point data of a road edge, the laser point data of the road edges in ascending order of height values in the laser point data.

S940. Deleting, if a difference between height values of two adjacent laser points after the sorting is greater than a preset difference threshold, the lower-ranking laser point in the two adjacent laser points and laser points following the laser point.

S950. Obtaining laser point data of one key point of the road edge based on laser point data of the road edge retained in the grid cell.

S960. Sorting, if road-side laser point cloud data in one grid cell includes laser point data of an upright object by a side of the road, the laser point data of the upright object by the side of the road in ascending order of height value in the laser point data.

S970. Deleting, if a height difference between two adjacent laser points after the sorting is greater than a preset difference threshold, the lower-ranking laser point in the two adjacent laser points and laser points following the laser point.

S980. Determining whether the smallest height value in retained laser point data of the upright object is smaller than a preset first height threshold and whether the largest height value is greater than a preset second height threshold, and obtaining, if the smallest height value is smaller than the first height threshold and the largest height value is greater than the second height threshold, laser point data of one key point of the upright object based on the laser point data of the upright object retained in the grid cell.

Specific content of step S910 to S960 can be referred to content of similar steps in FIG. 6, FIG. 7a, and FIG. 8a. Details are not described herein.

In an actual application scenario, to reduce suspension points and spurious points in the extracted road-surface laser point cloud data and road-side laser point cloud data, after the laser point cloud data is obtained, the suspension points in the laser point cloud data are first filtered out, so that laser point cloud data after the filtering corresponds to real and valid environmental data. For example, after the road-surface laser point cloud data and the road-side laser point cloud data are divided into grid cells, sorting is performed according to height values of laser points, suspension points in the grid cells are filtered out, and only entity points consecutive from the road surface are retained. Laser point data of suspension objects such as branches other than the trunk of a tree may be effectively filtered out in the process.

Figure 9B:
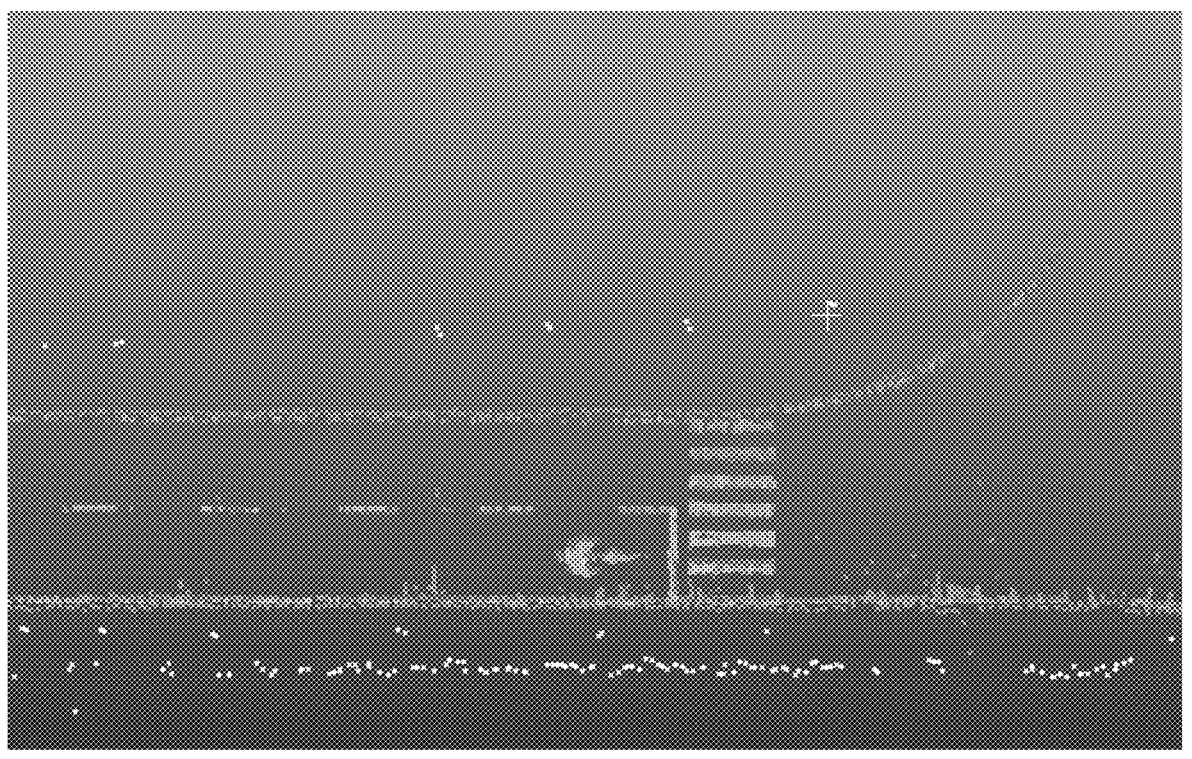
FIG. 9*b* is a laser point cloud map of ground marking points, edge points on two sides of a road, upright object points on two sides of the road, according to an embodiment of this specification.

In conclusion, FIG. 9b is a schematic diagram of a laser point cloud of key points of ground markings, road edges, and upright objects by a side of the road that are extracted from the preset regional range.

Based on the embodiment shown in FIG. 4a, in this embodiment, further, a target object is determined as a ground marking on a road, a road edge, or an upright object by a side of the road, and the road-surface laser point cloud data and road-side laser point cloud data are divided into grid cells according to a preset grid cell size; and laser point data of one key point of a corresponding target object may be respectively obtained based on laser point data of the ground marking, laser point data of the road edge, and laser point data of the upright object by a side of the road in the grid cells, thereby conveniently and quickly obtaining laser point data of key points of ground markings, road edges, and upright objects by a side of the road.

A conventional positioning data generation method based on laser point clouds mainly includes followings.

Laser point cloud diluting in a three-dimensional space: An original laser point cloud data volume is large, and the three-dimensional space is divided into several grid cells (having a size of 10*10*10 cm), where each grid cell stores one laser point to reduce a laser point cloud data volume.

Laser point cloud diluting on the ground: A ground is first extracted from an original point cloud, and a ground point cloud is then gridded in a two-dimensional space, where each grid cell only stores statistics information of the reflectivity of the ground point cloud.

Laser point cloud diluting by two sides of the road: A road reference line is first generated, a laser point cloud is then projected onto two sides of the road perpendicular to the reference line, only laser points closest to the reference line are retained, and each grid is stored in a positioning map layer after the laser points are gridded.

However, all the methods have specific deficiencies.

In the first solution, the data volume is excessively large, which is not suitable to storage, matching, and positioning. Some pieces of data (such as shrubs and branches) in the environment change as time, seasons, and climate change, making it difficult to perform effective positioning.

In the second solution, only the reflectivity of ground laser point cloud is retained, and it is difficult to accurately obtain the ground reflectivity when there is water or snow on the ground. Consequently, matching and positioning cannot be performed.

The second solution relies on the reference line, and there are excessive steps of generating maps. Some laser point clouds (such as shrubs and branches) by either side of the road change as time, seasons, and climate change, making it difficult to perform effective positioning. In addition, because this solution only stores data by either side of the road, if there are other vehicles by either side of an autonomous vehicle, a positioning result may be affected.

The positioning data generation method provided in this specification remedies the deficiencies in the conventional methods. An easily recognizable road object with a stable attribute on the road and/or by either side of the road is used as target object, and laser point data of key points of the target object is extracted as positioning data of the road. Such a road object generally does not change as an environment changes or as time goes by. Positioning is matching environmental information obtained in real time when a vehicle travels with positioning data, so as to determine a position of the vehicle. Therefore, laser point data of key points of an easily recognizable road object with a stable attribute on a road and/or by either side of the road is extracted as positioning data, so that a positioning success rate can be ensured. In addition, in this specification, only the laser point data of the key points is extracted. Therefore, a data volume is smaller, facilitating storage and transmission of the data.

Embodiment 7

Figure 10:
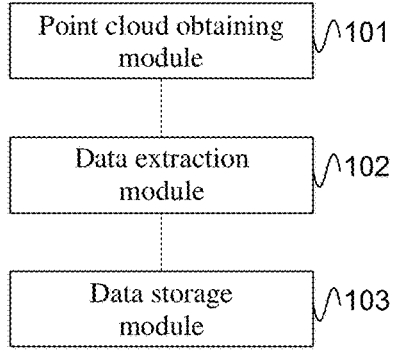
FIG. 10 is structural diagram 1 of a positioning data generation apparatus, according to an embodiment of this specification.

FIG. 10 is a structural diagram 1 of a positioning data generation apparatus, according to an embodiment of this specification. The positioning data generation apparatus may be disposed in the positioning data generation system shown in FIG. 2, and is configured to perform steps of the method shown in FIG. 3a. The apparatus includes:

a point cloud obtaining module 101, configured to obtain laser point cloud data in a preset regional range on a road and/or by either side of the road;

a data extraction module 102, configured to extract laser point data of key points of a target object on the road and/or by either side of the road from the laser point cloud data, where the target object is an easily recognizable road object with a stable attribute on the road and/or by either side of the road; and a data storage module 103, configured to store the extracted laser point data of the key points of the target object as a piece of a plurality of pieces of positioning data of the road, the plurality of pieces of positioning data corresponding to a plurality of target objects on or by either side of the road.

Figure 11:
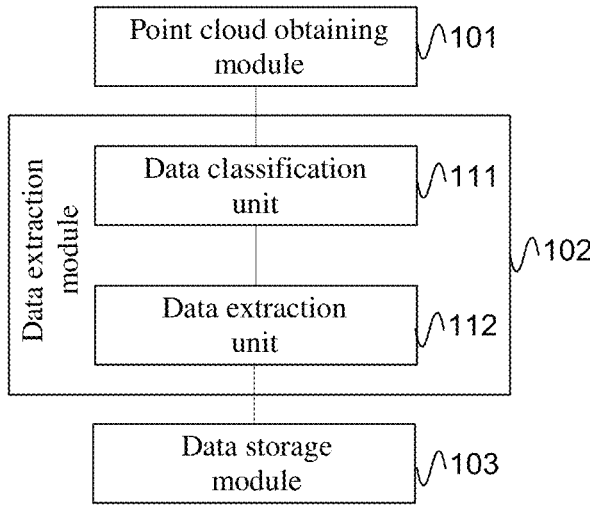
FIG. 11 is structural diagram 2 of a positioning data generation apparatus, according to an embodiment of this specification.

Further, as shown in FIG. 11, in the positioning data generation apparatus shown in FIG. 10, the data extraction module 102 may include:

a data classification unit 111, configured to classify the laser point cloud data as road-surface laser point cloud data and/or road-side laser point cloud data; and a data extraction unit 112, configured to extract the laser point data of the key points of the target objects on the road from the road-surface laser point cloud data or target objects by either side of the road from the road-side laser point cloud data.

Figure 12:
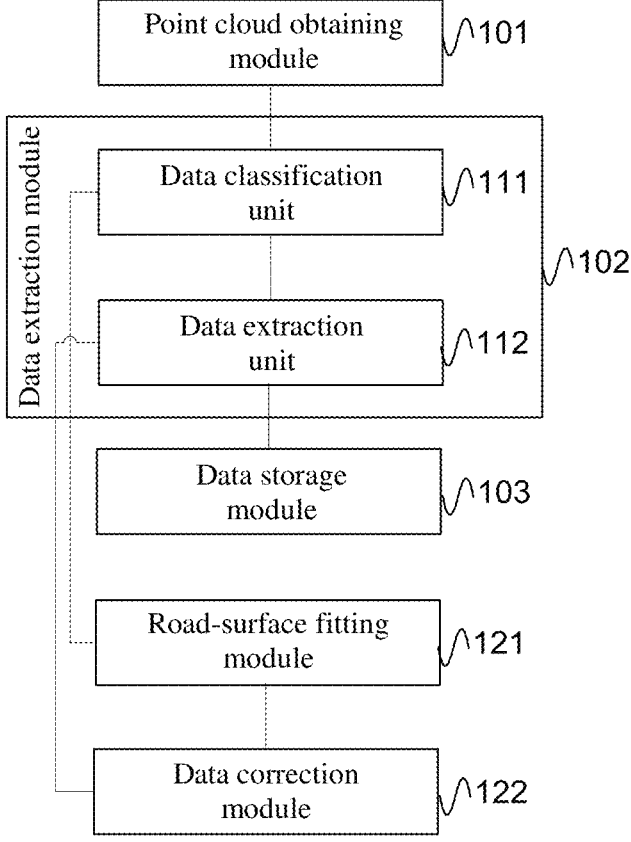
FIG. 12 is structural diagram 3 of a positioning data generation apparatus, according to an embodiment of this specification.

Further, as shown in FIG. 12, the positioning data generation apparatus shown in FIG. 11 may further include:

a road-surface fitting module 121, configured to fit a road surface of the road according to the road-surface laser point cloud data; and a data correction module 122, configured to adjust, based on the fitted road surface, height values of laser points of the road-surface laser point cloud data and/or the road-side laser point cloud data to a height values relative to the fitted road surface.

The positioning data generation apparatus shown in FIG. 11 and FIG. 12 may correspondingly perform steps of the methods shown in FIG. 4a and FIG. 5.

Figure 13:
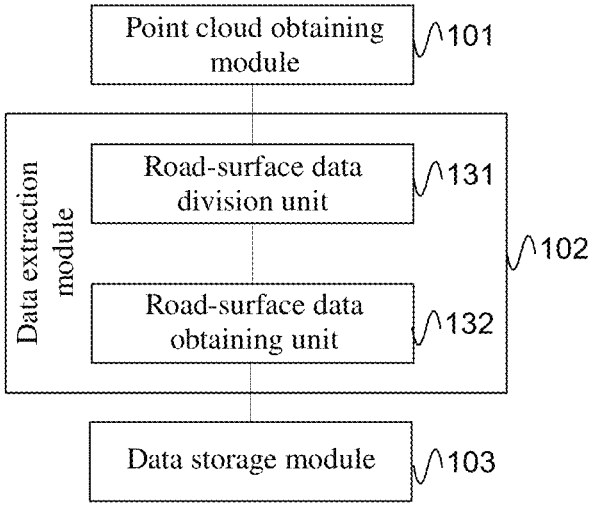
FIG. 13 is structural diagram 4 of a positioning data generation apparatus, according to an embodiment of this specification.

Further, as shown in FIG. 13, the target object may be a ground marking on the road, and the data extraction module 102 may include:

a road-surface data division unit 131, configured to divide the road-surface laser point cloud data into a plurality of grid cells according to a preset grid cell size; and a road-surface data obtaining unit 132, configured to obtain, if road-surface laser point cloud data in one grid cell of the plurality of grid cells includes laser point data of the ground marking, laser point data of one key point of the ground marking based on the laser point data of the ground marking in the grid cell.

The positioning data generation apparatus shown in FIG. 13 may perform steps of the method shown in FIG. 6.

Figure 14:
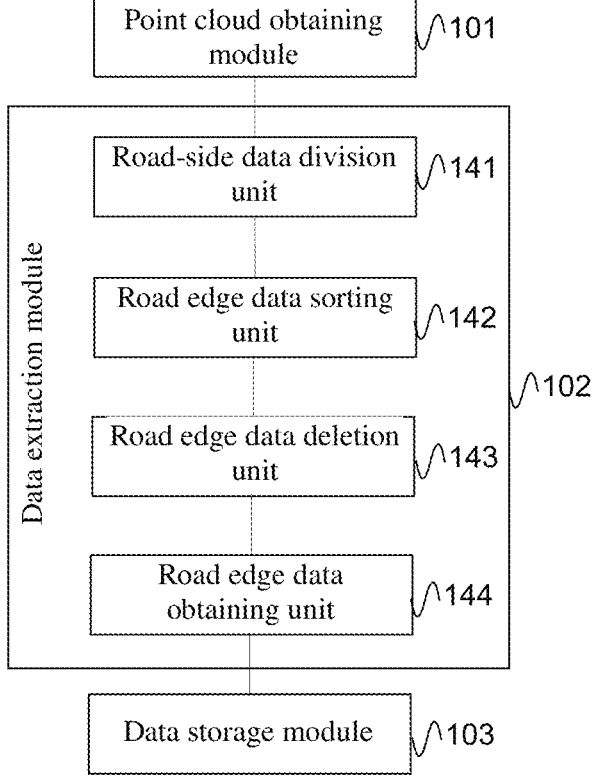
FIG. 14 is structural diagram 5 of a positioning data generation apparatus, according to an embodiment of this specification.

Further, as shown in FIG. 14, the target object may be a road edge, and the data extraction module 102 may include:

a road-side data division unit 141, configured to divide the road-side laser point cloud data into a plurality of grid cells according to a preset grid cell size;

a road edge data sorting unit 142, configured to sort, if road-side laser point cloud data in one grid cell of the plurality of grid cells includes laser point data of the road edge, the laser point data of the road edge in ascending order of height values of laser points in the laser point data;

a road edge data deletion unit 143, configured to delete, if a difference between height values of two adjacent laser points after the sorting is greater than a preset difference threshold, the lower-ranking laser point in the two adjacent laser points and laser points following the laser point; and a road edge data obtaining unit 144, configured to obtain laser point data of one key point of the road edge based on laser point data of the road edge retained in the grid cell.

The positioning data generation apparatus shown in FIG. 14 may perform steps of the method shown in FIG. 7a.

Figure 15:
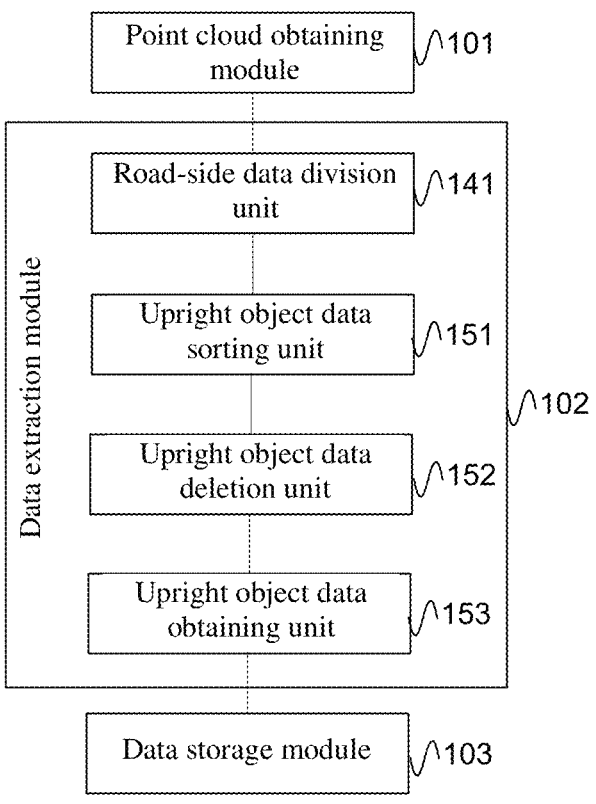
FIG. 15 is structural diagram 6 of a positioning data generation apparatus, according to an embodiment of this specification.

Further, as shown in FIG. 15, the target object may be an upright object by a side of the road, and the data extraction module 102 may include:

a road-side data division unit 141, configured to divide the road-side laser point cloud data into a plurality of grid cells according to a preset grid cell size;

an upright object data sorting unit 151, configured to sort, if road-side laser point cloud data in one grid cell of the plurality of grid cells includes laser point data of an upright object by a side of the road, the laser point data of the upright object by the side of the road in ascending order of height values in the laser point data;

an upright object data deletion unit 152, configured to delete, if a height difference between two adjacent laser points after the sorting is greater than a preset difference threshold, the lower-ranking laser point in the two adjacent laser points and laser points following the laser point; and an upright object data obtaining unit 153, configured to: determine whether the smallest height value in retained laser point data of the upright object is smaller than a preset first height threshold and whether the largest height value is greater than a preset second height threshold, and obtain, if the smallest height value is smaller than the first height threshold and the largest height value is greater than the second height threshold, laser point data of one key point of the upright object based on the laser point data of the upright object retained in the grid cell.

The positioning data generation apparatus shown in FIG. 15 may perform steps of the method shown in FIG. 8a.

Figure 16:
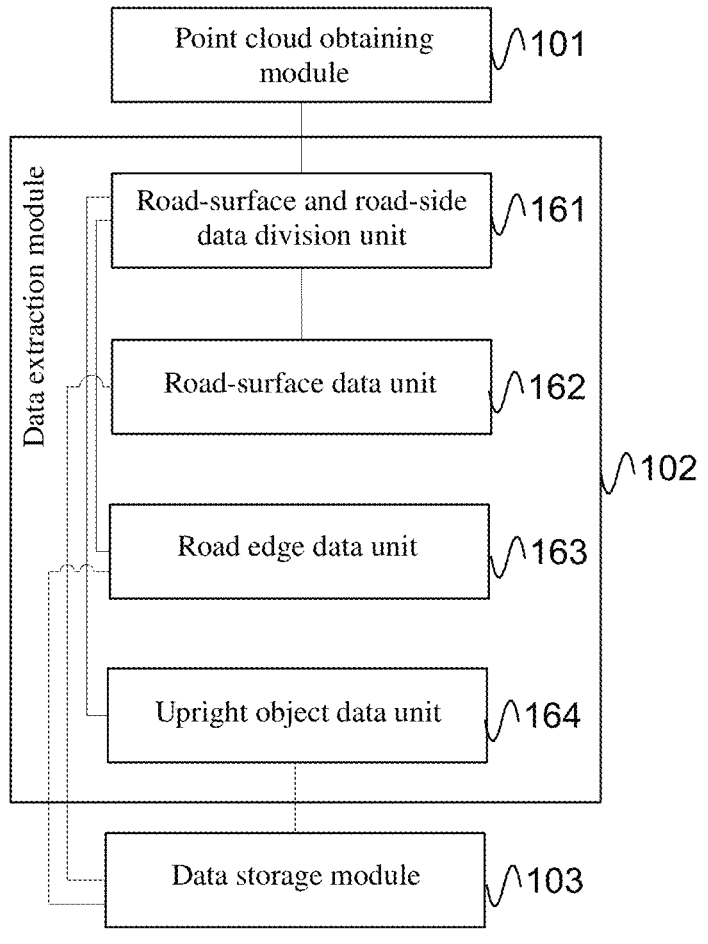
FIG. 16 is structural diagram 7 of a positioning data generation apparatus, according to an embodiment of this specification.

Further, as shown in FIG. 16, the target object may include a ground marking, a road edge, and an upright object by a side of the road, and the data extraction module 102 may include:

a road-surface and road-side data division unit 161, configured to divide the road-surface laser point cloud data and the road-side laser point cloud data into a plurality of grid cells according to a preset grid cell size;

a road-surface data unit 162, configured to obtain, if road-surface laser point cloud data in one grid cell of the plurality of grid cells includes laser point data of a ground marking, laser point data of one key point of the ground marking based on the laser point data of the ground marking in the grid cell;

a road edge data unit 163, configured to: sort, if road-side laser point cloud data in one grid cell includes laser point data of a road edge, the laser point data of the road edges in ascending order of height values in the laser point data, delete, if a difference between height values of two adjacent laser points after the sorting is greater than a preset difference threshold, the lower-ranking laser point in the two adjacent laser points and laser points following the laser point, and obtain laser point data of one key point of the road edge based on laser point data of the road edge retained in the grid cell; and an upright object data unit 164, configured to: sort, if road-side laser point cloud data in one grid cell includes laser point data of an upright object by a side of the road, the laser point data of the upright object by the side of the road in ascending order of height values in the laser point data, delete, if a height difference between two adjacent laser points after the sorting is greater than a preset difference threshold, the lower-ranking laser point in the two adjacent laser points and laser points following the laser point, determine whether the smallest height value in retained laser point data of the upright object is smaller than a preset first height threshold and whether the largest height value is greater than a preset second height threshold, and obtain, if the smallest height value is smaller than the first height threshold and the largest height value is greater than the second height threshold, laser point data of one key point of the upright object based on the laser point data of the upright object retained in the grid cell.

The positioning data generation apparatus shown in FIG. 16 may perform steps of the method shown in FIG. 9a.

In the positioning data generation apparatus provided in this specification, laser point data of key points of a target object on a road and/or by either side of the road is extracted from obtained laser point cloud data in a preset regional range on the road and/or by either side of the road, and used as positioning data of the road for storage. Because the target object in this specification is an easily recognizable road object with a stable attribute on the road and/or by either side of the road, such a road object generally does not change as an environment changes or as time goes by. Positioning is matching environmental information obtained in real time when a vehicle travels with positioning data, so as to determine a position of the vehicle. Therefore, laser point data of key points of an easily recognizable road object with a stable attribute on a road and/or by either side of the road is extracted as the positioning data to ensure a positioning success rate. In addition, in this specification, only the laser point data of the key points is extracted. Therefore, a data volume is smaller, facilitating storage and transmission of the data.

Further, the laser point cloud data is classified as road-surface laser point cloud data and/or road-side laser point cloud data. Next, the laser point data of the key points of the target object on the road is extracted from the road-surface laser point cloud data and/or the target object by either side of the road is extracted from the road-side laser point cloud data, thereby conveniently and quickly obtaining the laser point data of the key points of the target object.

In addition, before the laser point data of the key points of the target object on the road and/or by either side of the road is extracted, a road surface of the road is fitted by using the road-surface laser point cloud data, and height values of the road-surface laser point cloud data and the road-side laser point cloud data are adjusted to height values relative to the road surface based on the fitted road surface, thereby ensuring the accuracy of height positions of the laser point cloud data.

Further, the target object is determined as a ground marking on the road, and the road-surface laser point cloud data is divided into grid cells according to a preset grid cell size. When it is determined that road-surface laser point cloud data in one grid cell includes laser point data of a ground marking, laser point data of one key point of the ground marking is obtained based on the laser point data of the ground marking in the grid cell, thereby conveniently and quickly obtaining laser point data of key points of ground markings.

Further, the target object is determined as a road edge, and the road-side laser point cloud data is divided into grid cells according to a preset grid cell size. When it is determined that road-side laser point cloud data in one grid cell includes laser point data of a road edge, the laser point data of the road edge is sorted in ascending order of height values in the laser point data. If a difference between height values of two adjacent laser points after the sorting is greater than a preset difference threshold, the lower-ranking laser point in the two adjacent laser points and laser points following the laser point are deleted. Finally, laser point data of one key point of the road edge is obtained based on laser point data of the road edge retained in the grid cell, thereby conveniently and quickly obtaining laser point data of key points of a road edge.

Further, the target object is determined as an upright object by a side of the road, and the road-side laser point cloud data is divided into grid cells according to a preset grid cell size. When it is determined that road-side laser point cloud data in one grid cell includes laser point data of an upright object by a side of the road, the laser point data of the upright object by a side of the road is sorted in ascending order of height values in the laser point data. If a difference between height values of two adjacent laser points after the sorting is greater than a preset difference threshold, the lower-ranking laser point in the two adjacent laser points and laser points following the laser point are deleted. Finally, whether the smallest height value in retained laser point data of the upright object is smaller than a preset first height threshold and whether the largest height value is greater than a preset second height threshold are determined, and if the smallest height value is smaller than the first height threshold and the largest height value is greater than the second height threshold, laser point data of one key point of the upright object is obtained based on the laser point data of the upright object retained in the grid cell, thereby conveniently and quickly obtaining laser point data of key points of upright objects by a side of the road.

Further, a target object is determined as a ground marking on a road, a road edge, or an upright object by a side of the road, and the laser point cloud data is divided into grid cells according to a preset grid cell size. When it is determined that the laser point cloud data in one grid cell includes laser point data of a ground marking, a road edge, or an upright object, laser point data of one key point of the ground marking, the road edge, or the upright object is obtained based on the laser point data of the ground marking, the road edge, or the upright object in the grid cell, thereby conveniently and quickly obtaining laser point data of key points of ground markings.

Embodiment 8

Figure 17:
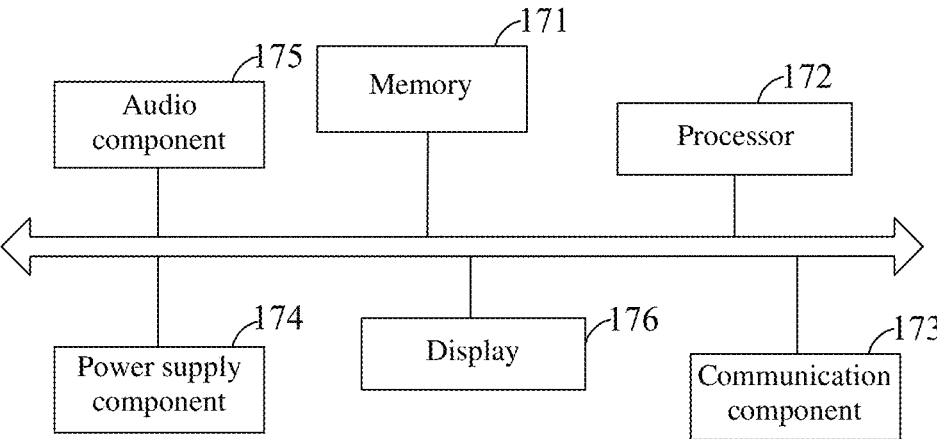
FIG. 17 is a schematic structural diagram of an electronic device, according to an embodiment of this specification.

An overall architecture of the positioning data generation apparatus is described above. The function of the apparatus can be implemented by using an electronic device. FIG. 17 is a schematic structural diagram of an electronic device, according to an embodiment of this specification. The electronic device includes a memory 171 and a processor 172. The memory 171 is configured to store a program.

In addition to the programs, the memory 171 may further be configured to store other data to support operations on the electronic device. Examples of the data include instructions of any application program or method for operations on the electronic device, such as contact data, address book data, a message, a picture, and a video.

The memory 171 can be implemented by any type of volatile or non-volatile storage devices or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk, or an optical disc.

The processor 172 is coupled to the memory 171 and configured to execute the program in the memory 171. The program, when run, performs any positioning data generation method in FIG. 3a, FIG. 4a, FIG. 5, FIG. 6, FIG. 7a, FIG. 8a, and FIG. 9a.

The foregoing processing operations have been described in detail in the previous embodiments, and will not be repeated herein.

Further, as shown in FIG. 17, the electronic device may further include: a communication component 173, a power supply component 174, an audio component 175, a display 176, and other components. Only some components are schematically shown in FIG. 17, which does not mean that the electronic device includes only the components shown in FIG. 17.

The communication component 173 is configured to facilitate communication between the electronic device and other devices in a wired or wireless manner. The electronic device may access a communication standard-based wireless network, such as Wi-Fi, 2G, 3G, or a combination thereof. In an example embodiment, the communication component 173 receives a broadcast signal or broadcast related information from an external broadcast management system via a broadcast channel. In an example embodiment, the communication component 173 further includes a near field communication (NFC) module, to promote short-range communication. For example, the NFC module may be implemented based on a radio frequency identification (RFID) technology, an infra-red data association (IrDA) technology, an ultra-wideband (UWB) technology, a Bluetooth (BT) technology, and other technologies.

The power supply component 174 provides power for components of the electronic device. The power supply component 174 may include a power supply management system, one or more power supplies, and other components related to generation, management, and allocation of power for the electronic device.

The audio component 175 is configured to output and/or input an audio signal. For example, the audio component 175 includes a microphone (MIC). When the electronic device is in the operating mode, such as a call mode, a record mode, and a speech recognition mode, the microphone is configured to receive an external audio signal. The received audio signal may further be stored in the memory 171 or sent through the communication component 173. In some embodiments, the audio component 175 further includes a speaker, configured to output an audio signal.

The display 176 includes a screen, which may include a liquid crystal display (LCD) and a touch panel (TP). If the screen includes a TP, the screen may be implemented as a touchscreen to receive an input signal from the user. The touch panel includes one or more touch sensors to sense a touch, a slide, and a gesture on the touch panel. The touch sensor may not only sense the boundary of touching or sliding operations, but also detect duration and pressure related to the touching or sliding operations.

A person of ordinary skill in the art may understand that all or some of the steps of the method embodiments may be implemented by a program instructing relevant hardware. The foregoing program may be stored in a computer-readable storage medium. When the program is executed, steps of the method embodiments are performed. The foregoing storage medium includes: a medium such as a ROM, a RAM, a magnetic disk, or an optical disc that can store program code.

Finally, the foregoing embodiments are merely used for describing the technical solutions of this specification, but are not intended to limit this specification. Although this specification is described in detail with reference to the foregoing embodiments, a person of ordinary skill in the art should understand that, modifications may still be made to the technical solutions in the foregoing embodiments, or equivalent replacements may be made to some or all of the technical features; and these modifications or replacements will not cause the essence of corresponding technical solutions to depart from the scope of the technical solutions in the embodiments of this specification.

What is claimed is:

1. A positioning data generation method, comprising:
obtaining laser point cloud data in a preset regional range on or by either side of a road;
classifying the laser point cloud data as road-surface laser point cloud data and road-side laser point cloud data;
fitting a road surface of the road according to the road-surface laser point cloud data, and
adjusting, based on the fitted road surface, height values of laser points in the road-surface laser point cloud data or the road-side laser point cloud data to height values relative to the fitted road surface;
extracting laser point data of key points of a target object on or by either side of the road from the laser point cloud data, wherein the target object is a road object on or by either side of the road, wherein the extracting comprises:
extracting a key point of a ground marking on the road by:

dividing the road-surface laser point cloud data into a plurality of grid cells according to a preset grid cell size;
identifying, in each grid cell, a plurality of laser points corresponding to the ground marking based on reflectivity; and
obtaining a key point of the ground marking in the grid cell based on the identified laser points; and
extracting a key point of an upright object by a side of the road by:
sorting laser points in the grid cell in ascending order of height values;
if a height value difference of two adjacent laser points after sorting is greater than a difference threshold, deleting a laser point having a larger height value in the two adjacent laser points and one or more laser points following the laser point;
in response to that (1) a smallest height value in the remaining laser points in the grid cell is smaller than a first height threshold and (2) a largest height value in the remaining laser points in the grid cell is greater than a second height threshold, obtaining the key point of the upright object in the grid cell based on the remaining laser points;
storing the extracted laser point data of the key points of the target object as a piece of a plurality of pieces of positioning data of the road, the plurality of pieces of positioning data corresponding to a plurality of target objects on or by either side of the road.

2. The method according to claim 1, wherein the reflectivity of laser points in each grid cell is calculated by:
calculating a quantity, an average value, and a variance of reflectivity of the laser points in each grid cell.

3. The method according to claim 1, wherein the target object comprises a road edge, and the extracting the laser point data of the key points of the target object by either side of the road from the road-side laser point cloud data comprises:
if road-side laser point cloud data in each grid cell comprises laser point data of the road edge, sorting the laser point data of the road edge in ascending order of height values of laser points in the laser point data in the grid cell;
if a difference between height values of two adjacent laser points after the sorting is greater than the difference threshold, updating the laser point data in the grid cell by deleting a laser point having a larger height value in the two adjacent laser points and one or more laser points following the laser point having the larger height value from the laser point data in the grid cell; and
obtaining laser point data of a key point of the road edge based on the updated laser point data of the road edge in the grid cell.

4. The method according to claim 1, wherein the classifying the laser point cloud data as road-surface laser point cloud data and road-side laser point cloud data comprises:
obtaining height catastrophe points corresponding to scan lines of laser points obtained by scanning of a laser radar; and
distinguishing boundary positions of laser point clouds on the road surface or laser point clouds by either side of the road according to the height catastrophe points.

5. A system for positioning, comprising a processor and a non-transitory computer-readable storage medium storing instructions executable by the processor to cause the system to perform operations comprising:

25 obtaining laser point cloud data in a preset regional range on or by either side of a road;

classifying the laser point cloud data as road-surface laser point cloud data and road-side laser point cloud data;

fitting a road surface of the road according to the road-surface laser point cloud data, and adjusting, based on the fitted road surface, height values of laser points in the road-surface laser point cloud data or the road-side laser point cloud data to height values relative to the fitted road surface;

extracting laser point data of key points of a target object on or by either side of the road from the laser point cloud data, wherein the target object is a road object on or by either side of the road, wherein the extracting comprises:

extracting a key point of a ground marking on the road by:

dividing the road-surface laser point cloud data into a plurality of grid cells according to a preset grid cell size;

identifying, in each grid cell, a plurality of laser points corresponding to the ground marking based on reflectivity; and obtaining a key point of the ground marking in the grid cell based on the identified laser points; and extracting a key point of an upright object by a side of the road by:

dividing the road-side laser point cloud data into a plurality of grid cells;

in each grid cell:

sorting laser points in the grid cell in ascending order of height values;

if a height value difference of two adjacent laser points after sorting is greater than a difference threshold, deleting a laser point having a larger height value in the two adjacent laser points and one or more laser points following the laser point;

in response to that (1) a smallest height value in the remaining laser points in the grid cell is smaller than a first height threshold and (2) a largest height value in the remaining laser points in the grid cell is greater than a second height threshold, obtaining the key point of the upright object in the grid cell based on the remaining laser points;

storing the extracted laser point data of the key points of the target object as a piece of a plurality of pieces of positioning data of the road, the plurality of pieces of positioning data corresponding to a plurality of target objects on or by either side of the road.

6. The system according to claim 5, wherein the reflectivity of laser points in each grid cell is calculated by:

calculating a quantity, an average value, and a variance of reflectivity of the laser points in each grid cell.

7. The system according to claim 5, wherein the target object comprises a road edge, and the extracting the laser point data of the key points of the target object by either side of the road from the road-side laser point cloud data comprises:

if road-side laser point cloud data in each grid cell of the plurality of grid cells comprises laser point data of the road edge, sorting the laser point data of the road edge in ascending order of height values of laser points in the laser point data in the grid cell;

if a difference between height values of two adjacent laser points after the sorting is greater than the difference threshold, updating the laser point data in the grid cell by deleting a laser point having a larger height value in the two adjacent laser points and one or more laser points following the laser point having the larger height value from the laser point data in the grid cell; and obtaining laser point data of a key point of the road edge based on the updated laser point data of the road edge in the grid cell.

8. The system according to claim 5, wherein the classifying the laser point cloud data as road-surface laser point cloud data and road-side laser point cloud data comprises:

obtaining height catastrophe points corresponding to scan lines of laser points obtained by scanning of a laser radar; and distinguishing boundary positions of laser point clouds on the road surface or laser point clouds by either side of the road according to the height catastrophe points.

9. A non-transitory computer-readable storage medium for positioning, configured with instructions executable by one or more processors to cause the one or more processors to perform operations comprising:

obtaining laser point cloud data in a preset regional range on or by either side of a road;

classifying the laser point cloud data as road-surface laser point cloud data and road-side laser point cloud data;

fitting a road surface of the road according to the road-surface laser point cloud data, and adjusting, based on the fitted road surface, height values of laser points in the road-surface laser point cloud data or the road-side laser point cloud data to height values relative to the fitted road surface;

extracting laser point data of key points of a target object on or by either side of the road from the laser point cloud data, wherein the target object is a road object on or by either side of the road, wherein the extracting comprises:

extracting a key point of a ground marking on the road by:

dividing the road-surface laser point cloud data into a plurality of grid cells according to a preset grid cell size;

identifying, in each grid cell, a plurality of laser points corresponding to the ground marking based on reflectivity; and obtaining a key point of the ground marking in the grid cell based on the identified laser points; and extracting a key point of an upright object by a side of the road by:

dividing the road-side laser point cloud data into a plurality of grid cells;

in each grid cell:

sorting laser points in the grid cell in ascending order of height values;

if a height value difference of two adjacent laser points after sorting is greater than a difference threshold, deleting a laser point having a larger height value in the two adjacent laser points and one or more laser points following the laser point;

in response to that (1) a smallest height value in the remaining laser points in the grid cell is smaller than a first height threshold and (2) a largest height value in the remaining laser points in the grid cell is greater than a second height threshold, obtaining the key point of the upright object in the grid cell based on the remaining laser points;

storing the extracted laser point data of the key points of the target object as a piece of a plurality of pieces of positioning data of the road, the plurality of pieces of positioning data corresponding to a plurality of target objects on or by either side of the road.

10. The non-transitory computer-readable storage medium according to claim 9, wherein the reflectivity of laser points in each grid cell is calculated by:

calculating a quantity, an average value, and a variance of reflectivity of the laser points in each grid cell.

11. The non-transitory computer-readable storage medium according to claim 9, wherein the target object comprises a road edge, and the extracting the laser point data of the key points of the target object by either side of the road from the road-side laser point cloud data comprises:

if road-side laser point cloud data in the grid cell of the plurality of grid cells comprises laser point data of the road edge, sorting the laser point data of the road edge in ascending order of height values of laser points in the laser point data in the grid cell;

if a difference between height values of two adjacent laser points after the sorting is greater than the difference threshold, updating the laser point data in the grid cell by deleting a laser point having a larger height value in the two adjacent laser points and one or more laser points following the laser point having the larger height value from the laser point data in the grid cell; and obtaining laser point data of a key point of the road edge based on the updated laser point data of the road edge in the grid cell.

12. The method of claim 1, wherein the fitting the road surface comprises:

(a) randomly extracting three data points from the road-surface laser point cloud data;

(b) generating a plane using the three data points, determining distances between the road-surface laser point data and the generated plane, and determining a quantity of laser points that are within a distance range from the generated plane; and (c) repeating (a) and (b) for a plurality of times to generate multiple planes, and selecting a fitted plane that is associated with a largest quantity of road-surface laser point data within the distance range, wherein a portion of the fitted plane located within a road region is identified as the road surface.

* * * * *